(12) United States Patent
Gate et al.

(10) Patent No.: US 11,560,154 B1
(45) Date of Patent: Jan. 24, 2023

(54) AUTONOMOUS VEHICLE REMOTE TELEOPERATIONS SYSTEM

(71) Applicant: Aurora Innovation, Inc., Palo Alto, CA (US)

(72) Inventors: Gwennael Herve Jonathan Gate, Pittsburgh, PA (US); Dmitriy Kislovskiy, Pittsburgh, PA (US); Narek Melik-Barkhudarov, Edgewood, CA (US); Nathaniel Gist, IV, Pittsburgh, PA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 253 days.

(21) Appl. No.: 16/918,525

(22) Filed: Jul. 1, 2020

Related U.S. Application Data

(60) Provisional application No. 63/033,419, filed on Jun. 2, 2020.

(51) Int. Cl.
*B60W 60/00* (2020.01)
*G01C 21/36* (2006.01)

(52) U.S. Cl.
CPC .... *B60W 60/0011* (2020.02); *B60W 60/0015* (2020.02); *G01C 21/3614* (2013.01); *B60W 2556/50* (2020.02)

(58) Field of Classification Search
None
See application file for complete search history.

(56) References Cited

U.S. PATENT DOCUMENTS

| | | | |
|---|---|---|---|
| 9,507,346 B1* | 11/2016 | Levinson | G06F 3/04847 |
| 10,884,424 B2 | 1/2021 | Creusot | |
| 10,921,817 B1 | 2/2021 | Kangaspunta | |
| 10,976,732 B2 | 4/2021 | Lockwood | |
| 11,016,485 B2* | 5/2021 | Pedersen | G05D 1/0038 |
| 2012/0316763 A1 | 12/2012 | Haynes, III et al. | |
| 2015/0248131 A1 | 9/2015 | Fairfield et al. | |
| 2018/0136651 A1* | 5/2018 | Levinson | B60W 30/00 |
| 2018/0224844 A1* | 8/2018 | Zhang | H04L 67/1097 |
| 2018/0364704 A1 | 12/2018 | Liu | |
| 2019/0011910 A1* | 1/2019 | Lockwood | B60W 30/0956 |
| 2019/0042859 A1 | 2/2019 | Schubert et al. | |
| 2019/0272433 A1 | 9/2019 | Yu | |
| 2019/0286151 A1 | 9/2019 | Palanisamy et al. | |
| 2019/0354111 A1 | 11/2019 | Chen | |
| 2020/0132488 A1 | 4/2020 | Slutskyy | |
| 2020/0142417 A1 | 5/2020 | Hudecek | |
| 2020/0175326 A1 | 6/2020 | Shen | |
| 2020/0183394 A1 | 6/2020 | Lockwood et al. | |

(Continued)

OTHER PUBLICATIONS

Canadian Patent Application No. 3,120,270 filed May 31, 2021 titled Autonomous Vehicle Teleoperations System.

(Continued)

*Primary Examiner* — Tamara L Weber
(74) *Attorney, Agent, or Firm* — Gray Ice Higdon

(57) ABSTRACT

A teleoperations system may be used to modify elements in the mapping data used by an autonomous vehicle to cause the autonomous vehicle to control its trajectory based on the modified elements. In addition, in some instances, a teleoperations system may be used to generate virtual paths of travel for an autonomous vehicle based upon teleoperations system virtual path suggestion inputs.

17 Claims, 13 Drawing Sheets

(56) References Cited

U.S. PATENT DOCUMENTS

| | | | |
|---|---|---|---|
| 2020/0193549 A1* | 6/2020 | Pedersen | G08G 1/052 |
| 2020/0307568 A1 | 10/2020 | Takahashi | |
| 2020/0409352 A1 | 12/2020 | Caldwell | |
| 2020/0409368 A1 | 12/2020 | Caldwell | |
| 2021/0018916 A1* | 1/2021 | Thakur | G07C 5/0808 |
| 2021/0042535 A1 | 2/2021 | Abbott | |
| 2021/0078602 A1 | 3/2021 | Wray et al. | |
| 2021/0097304 A1 | 4/2021 | Agrawal | |
| 2021/0116907 A1* | 4/2021 | Altman | B60W 50/04 |
| 2021/0300422 A1 | 9/2021 | McGill et al. | |
| 2021/0325880 A1* | 10/2021 | Gogna | G05D 1/0038 |

OTHER PUBLICATIONS

U.S. Appl. No. 16/918,519, filed Jul. 1, 2020 titled Autonomous Vehicle Teleoperations System.
U.S. Appl. No. 16/918,528, filed Jul. 1, 2020 titled Autonomous Vehicle Teleoperations System.
United States Patent and Trademark Office, Non-Final Office Action for U.S. Appl. No. 16/918,519 dated Apr. 19, 2022, 46 pages.
United States Patent and Trademark Office, Non-Final Office Action for U.S. Appl. No. 16/918,528 dated Jun. 17, 2022, 36 pages.

* cited by examiner

AUTONOMOUS VEHICLE REMOTE TELEOPERATIONS SYSTEM

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

It has also been proposed to utilize teleoperations to complement vehicle autonomy, particularly for use in connection with handling certain irregular conditions that an autonomous vehicle may encounter within an environment. Events such as construction-related lane or road closures, funeral processions, emergency vehicles, loading or unloading school buses, crossing guards, police officers directing traffic, etc., while potentially uncommon, will still inevitably be encountered by autonomous vehicles from time to time, thus requiring autonomous vehicles to handle such events in a safe and reliable manner. With teleoperations, a remote system or operator operation may be placed in communication with an autonomous vehicle to assist with resolving any such events, and as such, it is desirable for a teleoperations system to efficiently and reliably support teleoperations for autonomous vehicles.

SUMMARY

The present disclosure is related to facilitating interaction between an autonomous vehicle and a teleoperations system. A teleoperations system may be used in some implementations to modify elements in the mapping data used by an autonomous vehicle in response to teleoperations system operator input to cause the autonomous vehicle to control its trajectory based on the modified elements. Furthermore, in some instances, a teleoperations system may be used to generate virtual paths of travel for an autonomous vehicle based upon teleoperations system-provided suggestions.

Therefore, consistent with one aspect of the invention, a method may include, in a teleoperations system in communication with an autonomous vehicle operating in an environment and remote from the teleoperations system, receiving context data collected by the autonomous vehicle from the environment in which the autonomous vehicle operates, presenting the received context data to a teleoperations system to provide situational awareness to the teleoperations system, and in the teleoperations system and in response to virtual path suggestion input defining a virtual path of travel, communicating path data to the autonomous vehicle to cause the autonomous vehicle to generate a path for the autonomous vehicle that follows the virtual path of travel.

Some implementations may also include validating the virtual path suggestion input prior to communicating the path data to the autonomous vehicle, and in response to unsuccessful validation of the virtual path suggestion input, rejecting the virtual path suggestion input. In addition, in some implementations, validating the virtual path suggestion input includes determining whether the virtual path of travel defined by the virtual path suggestion input violates a hard road boundary. Also, in some implementations, the virtual path suggestion input specifies a plurality of selected points on a map presented to a teleoperations system operator, and the path data describes the plurality of selected points. In addition, in some implementations, the virtual path suggestion input specifies a traced path on a map presented to the teleoperations system operator, and the path data describes the traced path.

Consistent with another aspect of the invention, a method may include, in an autonomous vehicle operating in an environment, communicating context data collected by the autonomous vehicle from the environment in which the autonomous vehicle operates to a teleoperations system in communication with and remote from the autonomous vehicle to provide situational awareness to the teleoperations system, in the autonomous vehicle, receiving path data from the teleoperations system generated in response to virtual path suggestion input defining a virtual path of travel, and in the autonomous vehicle and in response to the path data, generating a path for the autonomous vehicle that causes the autonomous vehicle to follow the virtual path of travel defined by the path data.

In addition, some implementations may also include validating the path data, and in response to unsuccessful validation of the path data, rejecting the path data. In some implementations, validating the path data includes determining whether the virtual path of travel defined by the path data violates a hard road boundary. Further, in some implementations, validating the path data validates the path data irrespective of a traffic control, lane boundary or direction of travel that would ordinarily prohibit travel of the autonomous vehicle through the virtual path of travel defined by the path data in the absence of receiving the path data from the teleoperations system. In addition, some implementations may also include determining whether executing the path violates any perception constraint for the autonomous vehicle. Further, in some implementations, the path data describes a plurality of points representing the virtual path of travel.

Some implementations may further include, in the autonomous vehicle and after receiving the path data from the teleoperations system, releasing a hold on the autonomous vehicle to allow the autonomous vehicle to traverse the generated path, and at the end of the generated path, initiating a hold on the autonomous vehicle such that the autonomous vehicle stops and waits for further data from the teleoperations system.

Consistent with another aspect of the invention, a method may include controlling an autonomous vehicle using mapping data that describes a plurality of elements disposed within an environment in which the autonomous vehicles operates, communicating context data collected by the autonomous vehicle from the environment to a teleoperations system in communication with and remote from the autonomous vehicle to provide situational awareness to the teleoperations system, receiving a map alteration command from the teleoperations system generated in response to the context data, modifying one or more elements in the mapping data used by the autonomous vehicle in response to the map alteration command, and controlling the autonomous vehicle using the mapping data subsequent to modifying the one or more elements such that a path of the autonomous vehicle is determined based at least in part on the modified one or more elements.

Further, in some implementations, the map alteration command requests closure of a previously-open lane of a roadway, and controlling the autonomous vehicle using the mapping data subsequent to modifying the one or more elements such that the path of the autonomous vehicle is determined based at least in part on the modified one or more elements includes determining the path such that the autonomous vehicle avoids the previously-open lane. In some implementations, the map alteration command requests opening of a previously-closed lane of a roadway, and controlling the autonomous vehicle using the mapping data subsequent to modifying the one or more elements such that the path of the autonomous vehicle is determined based at least in part on the modified one or more elements includes determining the path such that the autonomous vehicle is directed to travel within the previously-closed lane.

Moreover, in some implementations, the previously-closed lane is normally a non-drivable portion of a roadway. Further, in some implementations, the previously-closed lane is a shoulder of the roadway. In addition, in some implementations, the map alteration command requests a reduction in speed limit on at least a portion of a roadway, and controlling the autonomous vehicle using the mapping data subsequent to modifying the one or more elements such that the path of the autonomous vehicle is determined based at least in part on the modified one or more elements includes determining the path such that the autonomous vehicle travels at a reduced speed within the portion of the roadway.

Also, in some implementations, modifying the one or more elements in the mapping data includes changing a status of at least a portion of a roadway represented by the one or more elements. Moreover, in some implementations, the status includes a lane open status or a speed limit status. In some implementations, the mapping data is stored locally in the autonomous vehicle and is used by an autonomy component of the autonomous vehicle to control the autonomous vehicle. Further, in some implementations, the map alteration command is associated with a spatial extent that defines a length of roadway subject to a map alteration.

Also, in some implementations, the map alteration command is associated with a predetermined condition having an unknown spatial extent, and the method further includes monitoring the environment with the autonomous vehicle while the path of the autonomous vehicle is determined based at least in part on the modified one or more elements to determine a spatial extent of the predetermined condition.

Further, in some implementations, the predetermined condition is a lane blockage, and the method further includes determining an end of the lane blockage based upon monitoring the environment with the autonomous vehicle. Also, in some implementations, the map alteration command is associated with a predetermined condition having an unknown temporal extent, and the method further includes initiating a teleoperations session between the autonomous vehicle and the teleoperations system at a later time and when the autonomous vehicle has returned to a location associated with the one or more modified elements in the mapping data to assess whether the predetermined condition still exists. In addition, in some implementations, communicating the context data to the teleoperations system includes communicating autonomy, sensor, telemetry and/or video data to the teleoperations system.

Consistent with another aspect of the invention, a method may include, in a teleoperations system in communication with an autonomous vehicle operating in an environment and remote from the teleoperations system, receiving context data collected by the autonomous vehicle from the environment in which the autonomous vehicle operates, presenting the received context data to a teleoperations system to provide situational awareness to the teleoperations system, and in the teleoperations system, communicating a map alteration command to the autonomous vehicle to cause the autonomous vehicle to modify one or more elements in mapping data used by the autonomous vehicle to describe the environment in which the autonomous vehicle operates such that a path of the autonomous vehicle after receiving the map alteration command is determined based at least in part on the modified one or more elements.

In addition, some implementations may further include propagating the modifications to the one or more elements in the mapping data used by the autonomous vehicle to one or more additional autonomous vehicles. In some implementations, the map alteration command is associated with a predetermined condition having an unknown temporal extent, and the method further includes initiating a teleoperations session between the autonomous vehicle and the teleoperations system at a later time and when the autonomous vehicle has returned to a location associated with the one or more modified elements in the mapping data to assess whether the predetermined condition still exists.

Further, in some implementations, the map alteration command is associated with a predetermined condition having an unknown temporal extent, and the method further includes initiating a teleoperations session between a different autonomous vehicle and the teleoperations system at a later time and when the different autonomous vehicle has returned to a location associated with the one or more modified elements in the mapping data to assess whether the predetermined condition still exists. In some implementations, the autonomous vehicle includes a trained machine learning model, and the method further includes generating training data for the trained machine learning model in response to receiving the input.

Moreover, in some implementations, the input identifies a spatial extent that defines a length of roadway subject to a map alteration. Further, in some implementations, the input specifies an unknown spatial extent for a length of roadway subject to a map alteration. In some implementations, the input requests closure of a previously-open lane of a roadway. Also, in some implementations, the input requests opening of a previously-closed lane of a roadway. Moreover, in some implementations, the previously-closed lane is normally a non-drivable portion of a roadway. In addition, in some implementations, the input requests a reduction in speed limit on at least a portion of a roadway.

Some implementations may also include a system that is remotely located from an autonomous vehicle and includes one or more processors that are configured to perform various of the methods described above. Some implementations may also include an autonomous vehicle control system including one or more processors, a computer readable storage medium, and computer instructions resident in the computer readable storage medium and executable by the one or more processors to perform various of the methods described above. Still other implementations may include a non-transitory computer readable storage medium that stores computer instructions executable by one or more processors to perform various of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are generally directed to a teleoperations system for use with an autonomous vehicle. Prior to a discussion of these implementations, however, an example hardware and software environment within which the various techniques disclosed herein may be implemented will be discussed.

Hardware and Software Environment

Figure 1:
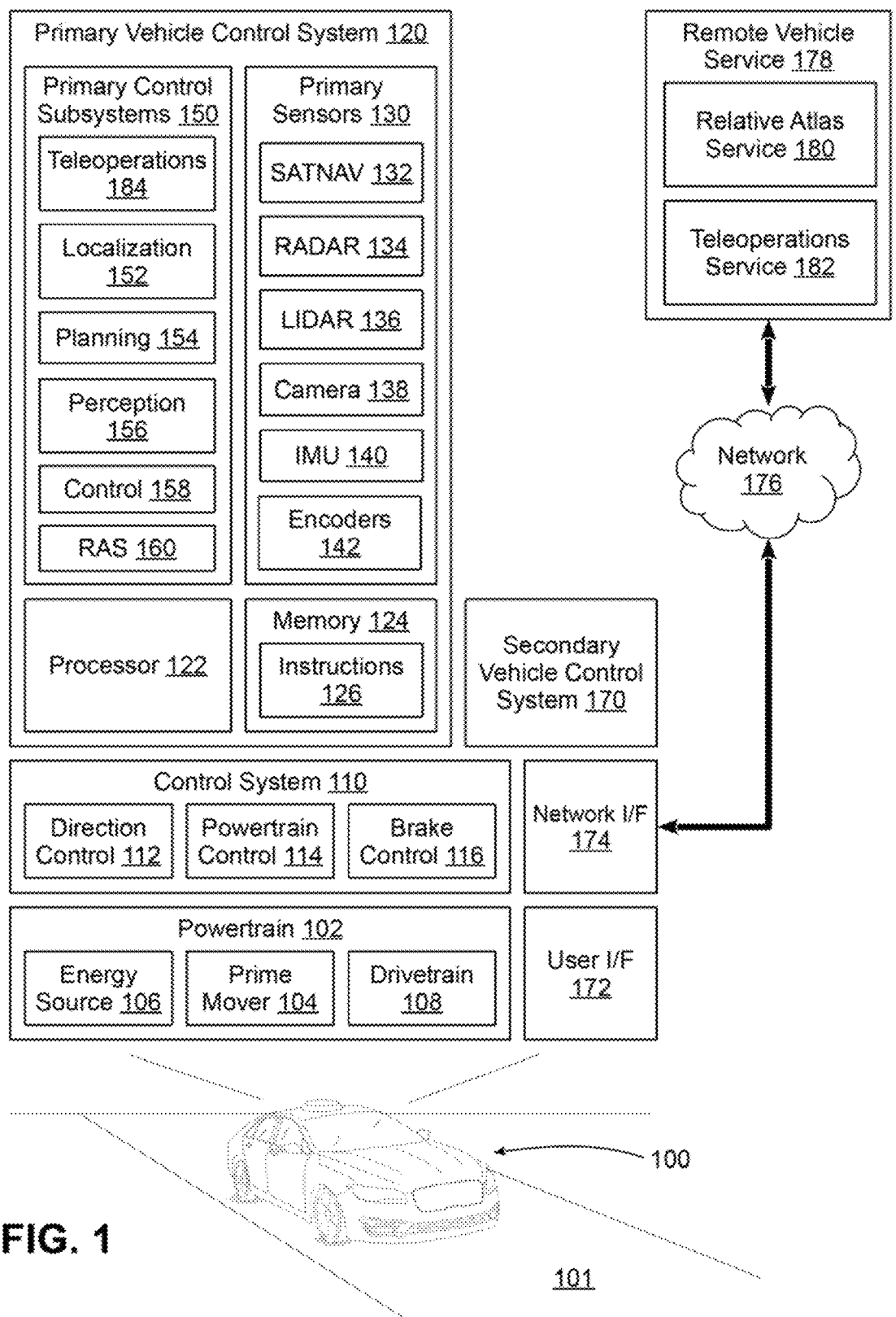
FIG. 1 illustrates an example hardware and software environment for an autonomous vehicle.

Turning to the Drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure.

Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as a digital camera 138 (which may include various types of image capture devices capable of capturing still and/or video imagery), may be used to sense stationary and moving objects within the immediate vicinity of a vehicle. An inertial measurement unit (IMU) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, and a control subsystem 158. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. Planning subsystem 154 is principally responsible for planning a path of motion for vehicle 100 over some timeframe given a desired destination as well as the static and moving objects within the environment, while perception subsystem 156 is principally responsible for detecting, tracking and/or identifying elements within the environment surrounding vehicle 100. Control subsystem 158 is principally responsible for generating suitable control signals for controlling the various controls in control system 110 in order to implement the planned path of the vehicle. Any or all of localization subsystem 152, planning subsystem 154, perception subsystem 156, and control subsystem 158 may have associated data that is generated and/or utilized in connection with the operation thereof, and that which may be communicated to a teleoperations system in some implementations.

In addition, a Relative Atlas Subsystem (RAS) 160 may be provided in the illustrated implementations to describe the elements within an environment and the relationships therebetween. RAS 160 may be accessed by each of the localization, planning and perception subsystems 152-156 to obtain various information about the environment for use in performing their respective functions. RAS 160 may be used to provide mapping data to the autonomous vehicle control system, which may be used for various purposes in an autonomous vehicle, including for localization, planning, and perception, among other purposes. Mapping data may be used, for example, to lay out or place elements within a particular geographical area, including, for example, elements that represent real world objects such as roadways, boundaries (e.g., barriers, lane dividers, medians, etc.), buildings, traffic devices (e.g., traffic signs, lights, etc.), as well as elements that are more logical or virtual in nature, e.g., elements that represent valid pathways a vehicle may take within an environment (referred to hereinafter as "gates"), "virtual" boundaries such as lane markings, or elements that represent logical collections or sets of other elements. Mapping data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In the illustrated implementation, RAS 160 may provide mapping data in a format in which the positions of at least some of the elements in a geographical area are defined principally based upon relative positioning between elements rather than any absolute positioning within a global coordinate system. It will be appreciated, however, that other atlas or mapping systems suitable for maintaining mapping data for use by autonomous vehicles may be used in other implementations, including systems based upon absolute positioning, so the invention is not limited to use with the particular relative atlas system disclosed herein. Furthermore, it will be appreciated that at least some of the mapping data that is generated and/or utilized by RAS 160 may be communicated to a teleoperations system in some implementations.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating autonomous vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 178 including, at least for the purposes of implementing various functions described herein, a relative atlas service 180 and a teleoperations service 182. Relative atlas service 180 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Teleoperations service 182 may be used, for example, to provide teleoperations support to vehicle 100, e.g., through communication with a teleoperations subsystem 184 resident in primary vehicle control system 120, as will be discussed in greater detail below.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via a network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Teleoperations System

Operating an autonomous vehicle in the complex and dynamic environments within which automobiles regularly operate often necessitates handling a diverse array of conditions that, while comparatively uncommon, are still regularly encountered by many autonomous vehicles over time. Autonomously handling these uncommon conditions in both a performant and safe way can be challenging, and some proposed approaches to addressing these uncommon conditions incorporate the use of teleoperations, or "human-in-the-loop" technology, to enable a human operator, who may be remote from the vehicle, to make decisions and assist in guiding a vehicle whenever some of these uncommon conditions are encountered by the vehicle.

Some proposed teleoperations approaches focus on direct control of a vehicle by a remote operator, whereby the operator is provided with sensor data collected by the vehicle and is able to directly control the vehicle from a remote location. It has been found, however, that direct control of a vehicle in such circumstances generally requires a fast, responsive and reliable network connection between the remote operator and the autonomous vehicle. Network connectivity and latency for an autonomous vehicle, however, can vary considerably based upon location (e.g., urban or rural, highway or side road, etc.) and network congestion. In addition, remote operators, even when provided with sensor data collected by a vehicle, may still lack full situational awareness due to the fact that they are not physically within the vehicle.

The disclosed implementations, on the other hand, focus on an indirect control methodology whereby a teleoperations service is able to provide suggestions or recommendations to an autonomous vehicle, while requiring any such directives or recommendations to be validated by the autonomous vehicle prior to being implemented. By doing so, safety and/or performance of the vehicle may be effectively decoupled from the performance of the network that links the teleoperations service with the autonomous vehicle.

Figure 2:
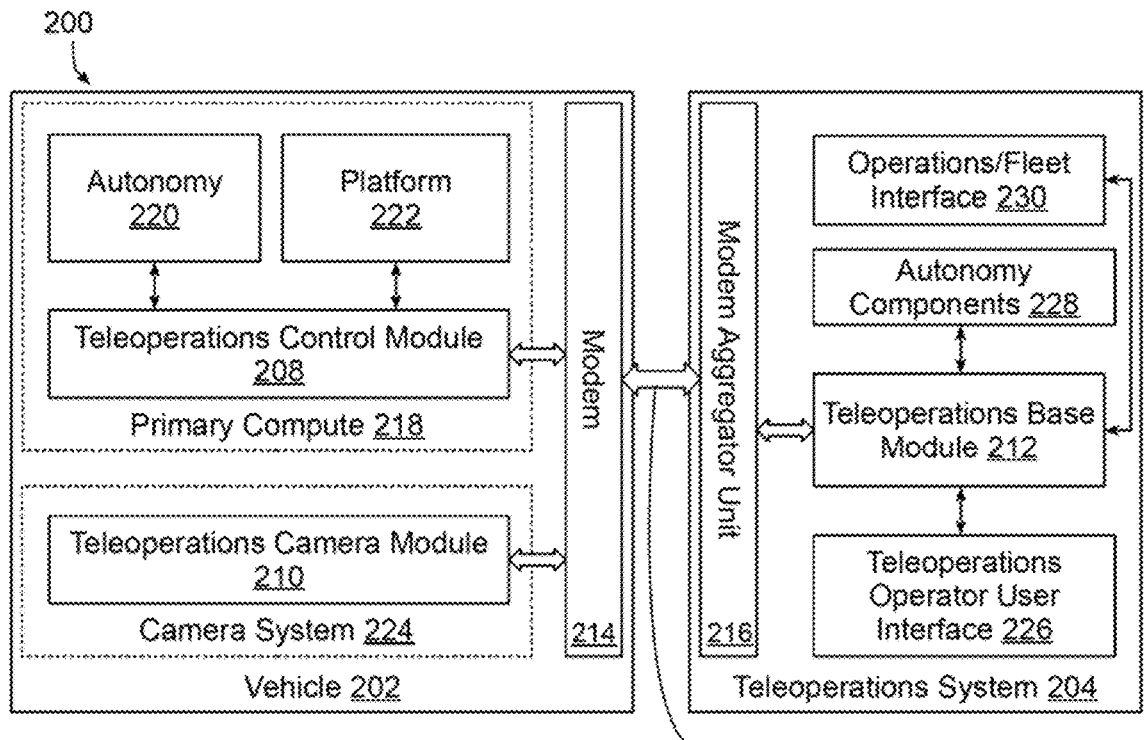
FIG. 2 is a block diagram illustrating an example implementation of a teleoperations-enabled system consistent with some implementations.

FIG. 2, for example, illustrates one example implementation of a teleoperations-enabled system or service 200 whereby an autonomous vehicle 202 is interfaced with a remote teleoperations system 204 over a network 206. Remote teleoperations system 204 may be physically remote from autonomous vehicle 202, and will generally support interface with multiple vehicles to enable multiple teleoperations operators to concurrently interact with multiple vehicles. As will become more apparent below, teleoperations operators may actively and continuously monitor individual vehicles in some implementations, while in other implementations, individual teleoperations operators may interact with multiple vehicles at different times, e.g., so that a particular operator may support multiple vehicles at one time. In some implementations, for example, teleoperations operators may be selectively coupled to particular autonomous vehicles on an on-demand basis, e.g., in response to requests generated by the vehicles whenever certain conditions (e.g., various uncommon situations that may benefit from teleoperations support) arise. In some implementations, a pool of operators may support a pool of autonomous vehicles, and a teleoperations system may initiate teleoperations sessions on an on-demand basis, e.g., based upon requests initiated by autonomous vehicles, the teleoperations system, or both.

Teleoperations support may be principally implemented in some implementations using a teleoperations control module 208 and a teleoperations camera module 210 in autonomous vehicle 202 in communication with a teleoperations base module 212 in teleoperations system 204. Modules 208 and 210 of vehicle 202 may be coupled to network 206 through a modem 214, while module 212 of teleoperations system 204 may be coupled to network 206 through a modem aggregator unit 216 capable of communicating with multiple modems 214 of multiple autonomous vehicles 202. Network 206 may be implemented in part using a wireless network such as a 4G, LTE or 5G network, a satellite network, or some combination thereof, although the invention is not so limited.

Teleoperations control module 208 may be resident in some implementations within a primary compute system 218 of vehicle 202, and may interface with each of an autonomy system 220 and platform 222 of the vehicle to collect and stream data from the primary compute system to teleoperations system 204 as well as receive and process operator inputs received from teleoperations system 204. In some implementations, primary compute system 218 may be implemented in a similar manner to primary vehicle control system 120 illustrated in FIG. 1, with autonomy system 220 representing high level autonomous control subsystems such as localization, planning, perception, etc., and with platform 222 representing lower level vehicle controls such as provided by control subsystem 158. However, it will be appreciated that teleoperations control module 208 may interface with practically any autonomy or control-related aspect of vehicle 202 in other implementations.

Teleoperations camera module 210 may be resident in some implementations within a camera system 224 that manages the on-board cameras on vehicle 202, and module 210 may, in some implementations, stream camera feed data collected from the on-board cameras to teleoperations system 204 for viewing by an operator during a teleoperations session. As will become more apparent below, in some implementations module 210 may dynamically vary the data streamed from the on-board cameras, e.g., to vary the priority, quality and/or resolution of each camera feed.

While modules 208 and 210 are implemented separately in FIG. 2, in other implementations, the functionality allocated to each module may vary, or the functionality may be combined into a single module or split into more than two modules. As such, the invention is not limited to the particular architecture illustrated in FIG. 2.

Teleoperations base module 212 communicates with modules 208 and 210 during a teleoperations session with vehicle 202, and may further manage multiple sessions for multiple vehicles and with multiple operators. Module 212 may also manage scheduling, initiation and termination of sessions in some implementations.

A teleoperations operator user interface 226 is coupled to module 212 to provide a user interface through which an operator, e.g., a human operator, may communicate with a vehicle 202 during a session. The user interface may be implemented in any number of suitable manners, and may utilize text, graphics, video, audio, virtual or augmented reality, keyboard input, mouse input, touch input, voice input, gesture input, etc. Dedicated or customized controls and/or indicators may also be used in some implementations. In addition, in some implementations an application, e.g., as may execute on a desktop computer or laptop computer, a mobile device, etc. may be utilized to interact with an operator, while in other implementations a web-based or remote interface may be used. In one example implementation discussed in greater detail below, for example, interface 226 may be a web-based interface that interacts with an operator via a touchscreen display.

Teleoperations system 204 may also include one or more autonomy components 228 interfaced with module 212. Autonomy components 228 may include various components that replicate the functionality of similar components in vehicle 202 and/or that are also accessible to a vehicle for use in connection with the primary control of the vehicle (e.g., components 240, 242 and 244 discussed below in connection with FIG. 3). For example, in some implementations, module 212 may have access to the same mapping data utilized by each vehicle, e.g., as provided by a relative atlas system as described above, as well as to similar layout functionality as is used by each vehicle to lay out mapping data in the immediate vicinity of a vehicle. By doing so, module 212 may effectively reconstruct a digital map of at least the fixed objects in the vicinity around a vehicle without having to receive the entire digital map from the vehicle itself, thereby reducing the volume of data streamed by the vehicle for the purpose of reconstructing the environment around the vehicle. In some implementations, the vehicle may provide a current pose of the vehicle as well as data regarding any dynamic entities detected by the perception system (e.g., other vehicles, pedestrians, or other actors or objects detected in the environment but not represented in the mapping data), and from this more limited amount of data, a graphical depiction of the immediate vicinity around a vehicle may be generated for display to a teleoperations operator. In some implementations, autonomy components may also replicate functionality implemented in vehicle 202 to enable local assessment of how a vehicle may respond to certain directives from the teleoperations system, and in some implementations, autonomy components may have similar functionality to that implemented in vehicle 202, but with greater capabilities and/or access to greater computing resources than may be available in the vehicle.

Moreover, in some implementations, a teleoperations system may be autonomous in nature as well, whereby the teleoperations system is effectively the teleoperations operator with which an autonomous vehicle interacts during a teleoperations session. In such instances, the teleoperations system may assess the current context of an autonomous vehicle and send commands, requests, directives, suggestions, etc. for addressing any conditions that triggered a teleoperations session. In some implementations, for example, a teleoperations system may have access to more compute power than can practically be provided onboard an autonomous vehicle, and thus the teleoperations system may be capable of performing computationally complex evaluations to assist an autonomous vehicle.

Teleoperations system 204 may also include an operations/fleet interface 230 to facilitate communication with other services that support autonomous vehicles. For example, it may be desirable in some implementations to provide an ability to request roadside assistance or recovery of an autonomous vehicle, or to provide log data for use in diagnosing vehicle issues. It may also be desirable to propagate data collected during a teleoperation session (e.g., data related to lane closures, detected construction or incidents, etc.) to other vehicles in a fleet. Moreover, data received and/or generated by the teleoperations system may be used as training data for further training various components of an autonomous vehicle, e.g., to improve the performance of a detector and reduce the occurrence of false positives, or to improve scenario selection and other decisions made by the autonomous vehicle in response to certain sensor input. Other external services may also interface with a teleoperations system in other implementations, as well be apparent to those of ordinary skill having the benefit of the instant disclosure.

Figure 3:
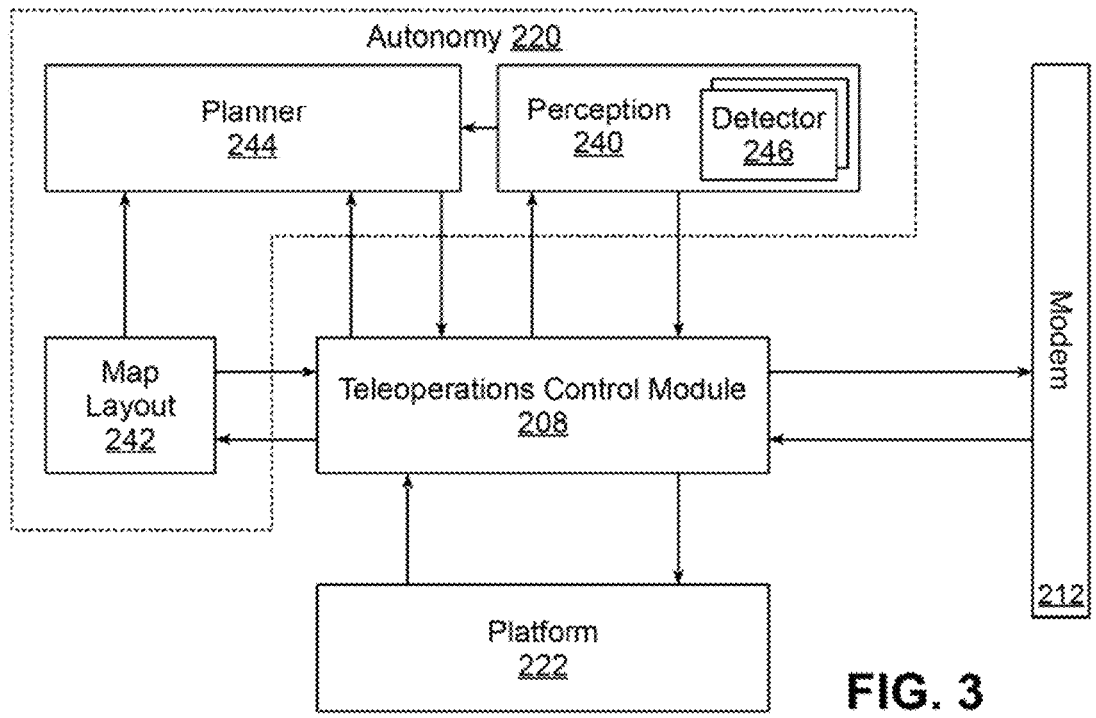
FIG. 3 is a block diagram further illustrating the teleoperations control module referenced in FIG. 2.

Now turning to FIG. 3, an example implementation of teleoperations control module 208 and the various interfaces supported thereby are illustrated in greater detail. In some implementations, for example, module 208 may include interfaces, e.g., Application Programming Interfaces (APIs) to teleoperations system 204 (via modem 212), to platform 222, and to each of a perception component 240, map layout component 242, and planner component 244 of autonomy component 220.

For the interface with teleoperations system 204, teleoperations control module 208 may be configured to communicate autonomy data (e.g., mapping data, perception data, route data, planning data), sensor data, telemetry data, etc. to teleoperations system 204 to provide the teleoperations system with the current status of the vehicle. Teleoperations control module 208 may also be configured to communicate various teleoperations requests to teleoperations system 204 and receive various teleoperations commands therefrom. Further, teleoperations control module 208 may be configured to receive requests for visualizations and communicate requested visualizations to teleoperations system 204.

Moreover, in some implementations it may be desirable to exchange heartbeat messages between teleoperations control module 208 and teleoperations system 204 to maintain an active connection between the autonomous vehicle and the teleoperations system. If, for example, due to loss of network connectivity, a failure of an autonomous vehicle to receive a heartbeat message from the teleoperations system within a defined time period or a failure of the teleoperations system to receive a heartbeat message from an autonomous vehicle within a defined period of time, it may be desirable in some implementations to take corrective action as a result of a lack of communication between the autonomous vehicle and the teleoperations system. From the perspective of the autonomous vehicle, it may be desirable to perform a controlled stop of the vehicle, while from the perspective of the teleoperations system it may be desirable to alert operations or fleet management.

For the interface with platform 222, teleoperations control module 208 may be configured to receive vehicle state information from the platform (e.g., various types of diagnostic and/or sensor data), and to issue various lower level commands to the platform, e.g., to honk a horn, activate or deactivate hazard lights, change gears, decommission the vehicle, initiate a controlled stop, etc.

For the interface with perception component 240, teleoperations control module 208 may be configured to receive from the perception component actors and/or tracks of actors detected in the environment, detections by various detectors 246 implemented in the perception component, and other perception-related data. All of such data may be communicated by module 208 to a teleoperations system as autonomy data. In addition, as will become more apparent below, module 208 may also communicate to perception component 240 any detector overrides generated by a teleoperations system, e.g., to indicate when a detector 246 has likely generated a false positive detection.

For the interface with map layout component 242, teleoperations control module 208 may receive, for example, local map data, route data and other mapping-related data from map layout component 242. Module 208 may also, in some instances, communicate map patches to map layout component 242, e.g., to generate lane closures, traffic device overrides, new destinations, virtual path suggestions, etc., or to clear out prior generated map patches applied to the local map stored in component 242, e.g., when a prior lane closure has been removed. Map layout component 242 may also, in some instances, forward map and route updates to planner component 244 to update scenarios being contemplated by the planner component during the operation of the autonomous vehicle.

For the interface with planner component 244, teleoperations control module 208 may receive, for example, generated plans, actor properties, alternate scenarios and other planning-related data. Teleoperations control module 208 may also forward various teleoperations commands to planner component 244, as well as receive teleoperations requests and/or feedback to teleoperations commands from planner component 244.

Figure 4:
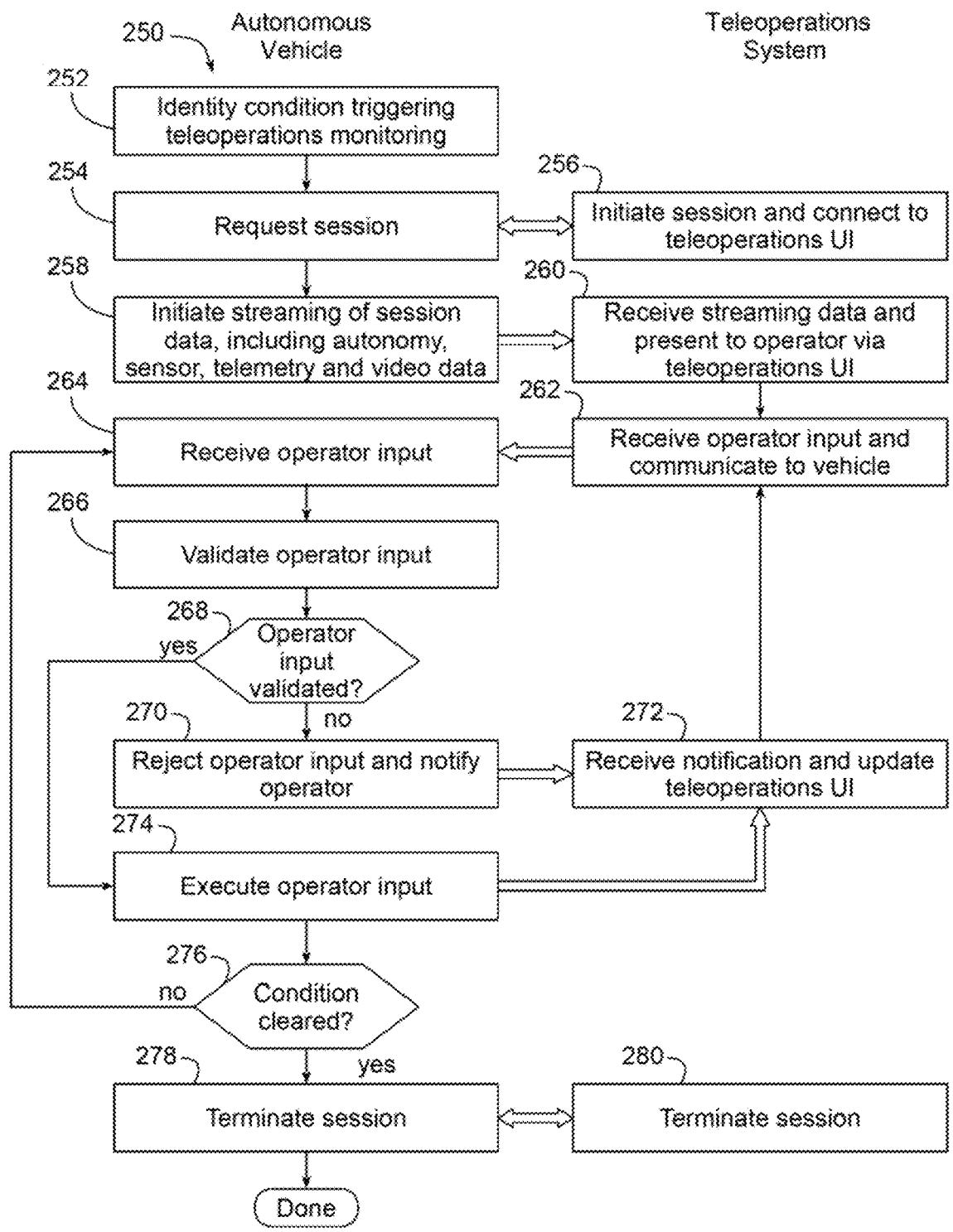
FIG. 4 is a flowchart illustrating an example sequence of operations for conducting a teleoperations session in the system of FIGS. 2-3.

Now turning to FIG. 4, while in some implementations interaction between a teleoperations system and an autonomous vehicle may be continuous (e.g., whenever a vehicle is operating), in the illustrated implementation interaction between a teleoperations system and an autonomous vehicle is managed through interactive sessions that are initiated on-demand, often (although not necessarily exclusively) upon the request of an autonomous vehicle. FIG. 4 illustrates a sequence of operations 250, for example, that manages an interactive session between an autonomous vehicle and a teleoperations system. Operations performed within the autonomous vehicle are illustrated on the left side of the figure and operations performed within the teleoperations system are illustrated on the right side of the figure.

As illustrated in block 252, an autonomous vehicle may initially detect a condition that triggers a desire for teleoperations monitoring. As will become more apparent below, a condition may include, for example, a detection by a detector in a perception component, a request from a planner component for assistance with selection of a suitable scenario or path given current circumstances, a request initiated by a vehicle occupant, an error condition detected in the autonomous vehicle, or other situations where teleoperations assistance may be desired. A non-exclusive list of potential conditions that may be sensed and used to trigger monitoring includes construction zones, temporary traffic devices, authorities directing traffic, loading or unloading school buses, emergency vehicles, the placement of signs, cones, or flares, crossing guards, funeral processions, collisions, inoperative traffic devices, etc. A condition that triggers a teleoperations session may also be based upon a scheduled time, a scheduled location (e.g., based upon the vehicle being at or proximate a particular geographical location, similar to a location-based reminder), or based upon a condition detected by another autonomous vehicle.

For example, it may be desirable in some implementations to automatically initiate teleoperations sessions with a vehicle in order to reassess certain conditions that have previously been detected, whether by the same autonomous vehicle or by other autonomous vehicles. One non-limiting example is that of a closed or rerouted lane that has been detected by an autonomous vehicle, and that during an initial teleoperations session results in the lane being marked closed to future travel. In some instances, the information about the closed lane condition may be propagated to other autonomous vehicles so that the other autonomous vehicles can be properly directed within another lane or to an entirely different road. Moreover, it may be desirable to automatically initiate a teleoperations session the next time the autonomous vehicle is at the same location, or even if another autonomous vehicle is in the same location, to enable a teleoperations systems operator to reassess the lane closure to determine if the original condition still exists. If the lane closure has been cleared, for example, this information may be propagated to other vehicles so that the other vehicles will no longer be directed around the previously-closed lane.

Now returning to FIG. 4, in response to detection of the condition, block 254 may communicate with the teleoperations service to request a session, which in block 256 initiates the session and connects the vehicle with an operator via a teleoperations user interface. It will be appreciated that at this time various routing decisions may be made to select an appropriate operator to interact with a vehicle, e.g., based upon operator availability (e.g., select only from among operators that are not currently in a session with another vehicle), operator expertise (e.g., select only from among operators having specific expertise with a particular condition or vehicle), operator responsibility (e.g., select only from among operators assigned to a particular fleet or set of vehicles), operator history (e.g., prioritize an operator that has previously been working with this particular vehicle), etc.

Once a session has been initiated, the autonomous vehicle may initiate streaming of session data in block 258. In some implementations, the session data can include autonomy data, sensor data, telemetry data and video data. The teleoperations system may receive the streamed session data and present the session data to the operator via the teleoperations user interface in block 260. The autonomy data may include, for example, various data associated with the current state of the vehicle or the current state of a control system for the vehicle. The autonomy data may include data related to states of detected conditions, plans, actors, actor paths, poses, scenarios, paths of the vehicle, etc. The sensor data may include, for example, data captured from various sensors such as radar, LIDAR, etc. In some implementations, the sensor data can also include image or video data obtained from one or more cameras. The telemetry data may include, for example, speed, location, acceleration, direction, etc., as well as various status information regarding the vehicle itself, e.g., various engine or motor data, fuel or charge data, or practically any other data that may be available from a vehicle. Video data may include, for example, streamed images captured by one or more cameras on the vehicle, e.g., to provide a visual look at the environment surrounding a vehicle (also referred to herein as "camera feed data"), as well as other image-related data such as historical or otherwise previously-stored video or still images. The session data that is streamed by the vehicle may otherwise include any type of data that assists a teleoperations operator with obtaining situational awareness regarding the current condition of the vehicle.

Thereafter, once presented with the session data, an operator may (i) generate one or more inputs that attempt to address the condition that triggered the session and (ii) communicate those inputs to the vehicle in block 262. The inputs may request additional data from a vehicle, may include one or more commands that instruct the vehicle to take a certain action, or may otherwise interact with the vehicle in order to address the condition.

Next, in block 264, the vehicle receives operator input, and block 266 validates the operator input. As noted above, in the illustrated implementation, an indirect control methodology is utilized whereby a teleoperations operator generally provides commands representing recommendations to an autonomous vehicle, which are then processed by the vehicle to implement those commands if appropriate. A recommendation refers to a high level directive provided to an autonomous vehicle. Based on the recommendation that is a high level directive, the autonomous vehicle control system may determine and execute a particular operation to control the autonomous vehicle rather than directly controlling the autonomous vehicle with the recommendation. For example, instead of providing, from a teleoperations system to the autonomous vehicle control system, commands specifying specific velocities, steering angles, and brake controls, recommendations such as "change lanes," "follow a suggested path," and "disregard a sensed condition" can be provided from a teleoperations system to an autonomous vehicle control system such that the autonomous vehicle control system can determine a particular operation such as specific velocities, steering angles, and brake controls to implement the recommendation. In these implementations, by providing the recommendations rather than the specific commands, less data may be transferred between the teleoperations system and the autonomous vehicle control system such that fewer network resources may be used.

In connection with processing those commands, the vehicle may validate those commands to ensure that the commands may be implemented without violating any constraints placed on the vehicle for performance and/or safety reasons. As an example, it may be desirable in some implementations to prohibit a teleoperations operator from recommending a path that would violate any boundaries established in mapping data (e.g., a boundary that prohibits a vehicle from using the shoulder of the road as a regular lane during normal operation).

In some implementations, it may also be desirable to delay or prohibit execution of commands until it is deemed safe for a vehicle to do so, e.g., based upon any perception constraints for the autonomous vehicle. For example, if a vehicle were to receive a directive to drive around an obstruction in a lane by driving into a lane that is primarily used for traffic in the opposite direction (e.g., to drive on the other side of a two-lane road), the vehicle may delay executing the directive until the perception component of the autonomous vehicle determines that the lane is free of traffic and/or pedestrians.

In some implementations, an autonomous vehicle, even in response to operator input from a teleoperations system, may effectively override and reject such input based upon one or more of operational constraints placed on the autonomous vehicle and current conditions sensed by the autonomous vehicle. Then, a notification indicating that the operator input from the teleoperations system is rejected can be provided from the autonomous vehicle to the teleoperations system. For example, where the operator input indicates honking the horn, an autonomous vehicle control system of an autonomous vehicle can determine not to honk the horn based on current conditions where the current conditions indicate that the autonomous vehicle is located in is a quiet residence area at midnight, or if other conditions exist such that the autonomous vehicle rejects the indication to honk the vehicle horn from the teleoperations system. In addition, the autonomous vehicle can send a notification of this rejection to the teleoperations system such that an operator can be notified that the operator input is rejected. In some implementations, this notification can be shared with other operators using the teleoperations system.

Thus, in response to the validation performed in block 266, block 268 may determine whether the operator input was validated. If not, control passes to block 270 to reject the operator input and notify the operator. This notification is received by the teleoperations system in block 272 and the teleoperations user interface is updated to reflect the rejection. Control then returns to block 262 to wait for additional input from the operator.

Returning to block 268, if the operator input has been validated, control passes to block 274 to execute the operator input. In some implementations, an autonomous vehicle can follow a path or scenario recommended by the operator input and execute particular operations to implement the path or the scenario. Once the autonomous vehicle system executes the operator input, the result of the execution can be updated to the teleoperations user interface. For example, the teleoperations user interface can be updated and show that the autonomous vehicle follows a particular path as recommended by the operator input.

Control then passes to block 276 to determine whether the condition that triggered the session has been cleared (e.g., when it is determined that a detector has been cleared, that an obstruction or other uncertainty detected by the vehicle has been resolved, etc.), and if not, control returns to block 264 to await further operator input (note that streaming of data continues to occur during this time so that the operator is provided with up-to-date information on the current status of the vehicle). If, however, the condition has been cleared, block 276 passes control to blocks 278 and 280 to terminate the session, whereby the vehicle interacts with the teleoperations system to discontinue the session on each end. In other instances, however, it may be desirable to wait and have an operator terminate a session rather than have the vehicle itself determine when the session is ready to be terminated.

As noted above, it may be desirable to utilize teleoperations support for a vehicle other than based upon conditions detected by the vehicle. For example, it may be desirable to initiate sessions whenever a vehicle transitions from a standby mode (e.g., where the vehicle is parked and idle) to any other mode (e.g., enroute, loading, unloading, or teleoperations modes) to ensure that an operator can view the environment surrounding the vehicle before the vehicle transitions. It will be appreciated, for example, that if a vehicle has been shut off for any appreciable amount of time, activities may have occurred while the vehicle was shut off that were not sensed by the vehicle, so a review by an operator prior to transitioning the vehicle may be desirable in some instances.

In addition, it may also be the case that an operator may monitor an autonomous vehicle continuously in some implementations, and may be able to initiate a session in response to circumstances that the vehicle may itself not detect, e.g., funeral processions, other vehicle collisions, vehicle collisions with actors that are not sensed by the vehicle, when a vehicle is creating a nuisance, etc.

Figure 5:
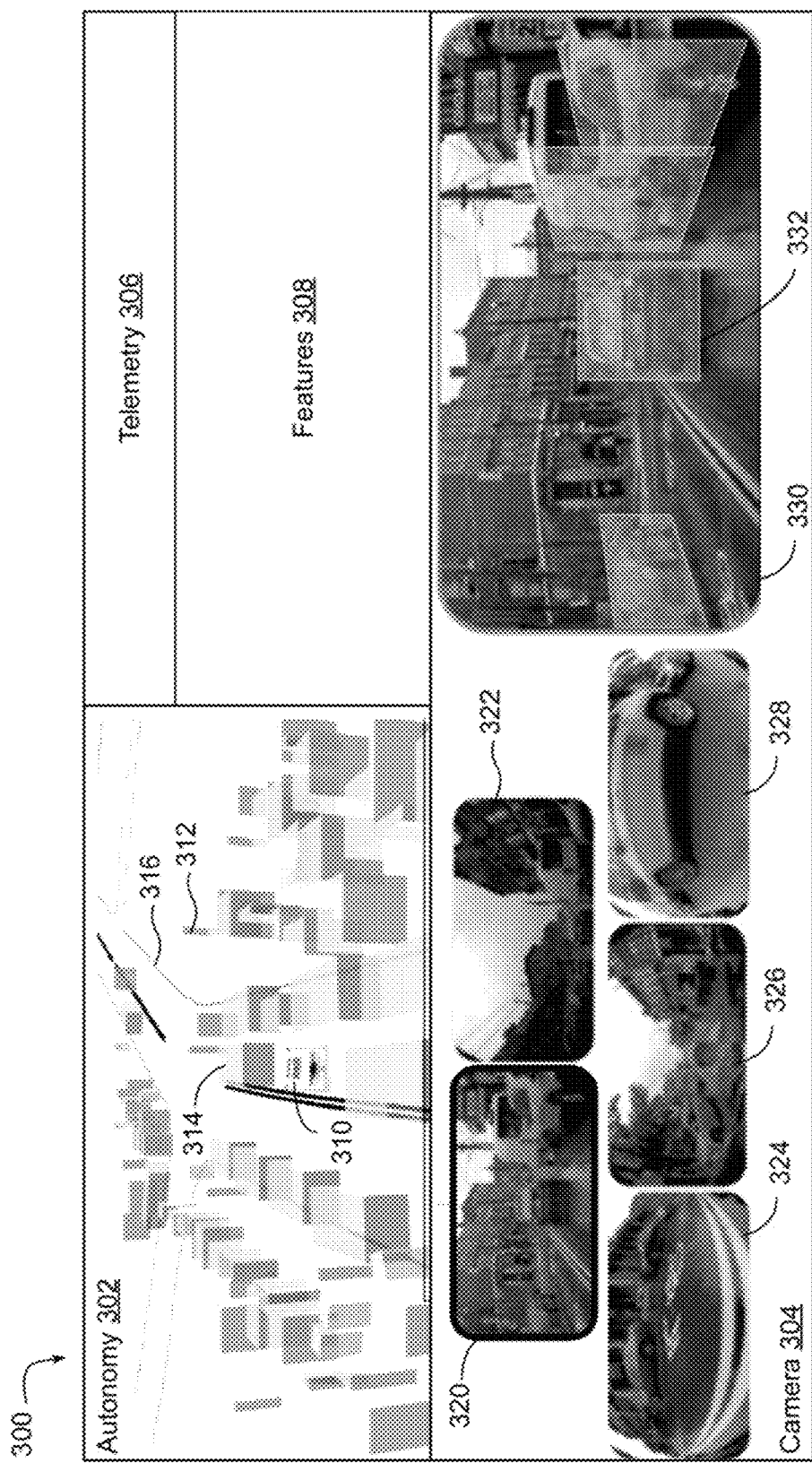
FIG. 5 illustrates an example teleoperations user interface for the system of FIGS. 2-3.

Now turning to FIG. 5, an example user interface that may be displayed to an teleoperations system operator, e.g., via a touchscreen or non-touch screen computer display, a mobile device display, or other suitable display technology, is illustrated at 300. In this example user interface, four panels 302-308 are utilized, including an autonomy panel 302, a camera panel 304, a telemetry panel 306 and a features panel 308.

Autonomy panel 302 may be used to display information from the autonomy component of an autonomous vehicle and reflecting the environment in which the vehicle is currently operating, including, for example, graphical depictions of the vehicle, its current path or trajectory, its current intended actions (e.g., stop, merge, follow, etc.), the boundaries, lanes, elements etc. of the road upon which it is operating, the fixed objects (e.g., buildings) within the environment, the dynamic objects or actors (e.g., pedestrians, bicycles, other vehicles, etc.) and/or their projected paths within the environment, ephemeral objects, etc. In some implementations, the same mapping data may be available to the teleoperations system as the autonomous vehicle, however, so a substantial portion of the data used to generate the visualization depicted in autonomy panel 302 (e.g., the road and fixed objects in the vehicle's environment) may be determined locally by the teleoperations system rather than by communicating that data from the vehicle to the teleoperations system, thereby reducing the bandwidth required to generate the visualization.

FIG. 5, for example, illustrates an example three-dimensional overhead following view for autonomy panel 302 including a graphical representation of an autonomous vehicle 310 as well as graphical representations of static objects in the environment (e.g., buildings 312), dynamic objects or actors in the environment (e.g., vehicle 314), and various boundaries in the environment (e.g., road boundary 316). Additional information, e.g., various paths or tracks of the vehicle and/or the dynamic objects, traffic lights and/or traffic light states, or any other information capable of supplementing a teleoperations system operator's situational awareness, may also be displayed in such a view.

Camera panel 304 may be used to display video data captured by one or more cameras disposed on the vehicle and streamed to the teleoperations system, thereby enabling an operator to view the vehicle's current environment and enhancing an operator's situational awareness. In the illustrated implementation, five cameras may be used, e.g., a forward-looking traffic light camera with a 120 degree field of view to provide situational awareness when loading/unloading a vehicle or to monitor traffic light state when enroute, along with four fisheye cameras with 180 degree fields of view and directed in forward, rear, left and right directions to provide situational awareness and/or to locate blocking objects surrounding the vehicle. In some implementations, an interior camera may also be used, as may other types of cameras for which situational awareness for a teleoperations operator would be improved. An example display of a forward-looking traffic light camera is illustrated at 320, while displays of forward, left, rear and right fisheye cameras are illustrated at 322, 324, 326 and 328. Other combinations of cameras, including fewer or greater numbers of cameras, may be used in other implementations, as well as different types of cameras having differing fields of view, differing resolution and/or different capabilities. For some types of longer vehicles, e.g., buses, trucks, etc., for example, additional side view cameras may be used to provide adequate coverage over the full lengths of such vehicles.

In some implementations, and as will become more apparent below, it may be desirable to highlight a particular camera feed, e.g., in a separate enlarged display 330, based upon a context of the vehicle and/or based on an operator's preference. Display 330, for example, illustrates an enlarged view of the traffic light camera feed, and it will be appreciated that the border of display 320 is highlighted to indicate this relationship.

In addition, in some implementations, any of displays 320-330 may be annotated with autonomy-related information, e.g., as represented by boxes 332 in display 330 that illustrate the extents of various actors in the vicinity of the vehicle. The autonomy-related information may be overlaid by the teleoperations system in some implementations, e.g., based upon the autonomy data received from the vehicle and used to generate the autonomy panel, while in other implementations the autonomy-related information may be integrated into the video data of a camera feed by the vehicle prior to communicating the video data to the teleoperations system, e.g., by painting or drawing boxes 332 or other textual and/or graphical elements onto the frames of the video data prior to communicating the video data to the teleoperations system.

In some implementations, an operator may select different camera feeds to present in display 330, e.g., by touching or clicking on one of displays 320-328. Further, in some implementations, a current context of the vehicle, determined either by the vehicle or the teleoperations system, may be used to select which camera feed is presented in display 330. For example, where a teleoperations session is initiated due to an obstruction detected on the right side of the vehicle, it may be desirable to initially present the camera feed for the right side fisheye camera in display 330.

Telemetry panel 306 may be used to display basic information about the vehicle, including, for example, speed, fuel or charge level, autonomy state, and any detected vehicle or autonomy system faults. Features panel 308 may be used to display various information and controls to be used by a teleoperations system operator to interact with the vehicle and provide commands, requests, directions or other feedback to the vehicle. While features panel 308 may concurrently support all of the possible interactions between an operator and a vehicle in some implementations, in other implementations it may be desirable to dynamically update features panel 308 to support different interactions based upon the context of the vehicle and/or input from the operator.

It will be appreciated that different arrangements, sizes, numbers, and layouts of panels and displays may be used in a teleoperations user interface in other implementations, and that more or less data and types of data may be presented to an operator through such an interface. In some implementations, a user interface may be configurable by an operator (e.g., to suit an operator's personal preferences). In some implementations, a user interface may be dynamically modified by the teleoperations system based upon contextual information (e.g., to enhance situational awareness by displaying or highlighting data that is most relevant to a particular situation). Other user interfaces and/or form factors may be used to interact with an operator in other implementations as well, e.g., using various input devices such as keyboards, mice, etc., using voice input, gesture input, touch input, etc. Therefore, the invention is not limited to the particular user interface implementations discussed herein.

Mapping Modifications

A teleoperations system may also be used in some implementations to modify mapping data used by an autonomous vehicle and thereby enable the autonomous vehicle to proceed with planning a path or trajectory based upon the updated mapping data. Situations where such functionality may be of use include, but are not limited to, construction zones, temporary traffic devices, authorities directing traffic, collisions, inoperative traffic devices, obstructions in a roadway, etc., as well as other geographical locations where various conditions may exist at those particular locations, at least temporarily. By modifying mapping data, the autonomy component of an autonomous vehicle is able in some implementations to continue to control the path or trajectory of the vehicle based upon its regular operational rules and constraints, just with the mapping data that the autonomy component accesses being modified at least on a temporary basis.

As an example, it may be desirable in some implementations to support one or more of a lane closure operation, a lane open operation and a speed limit reduction operation to at least temporarily modify mapping data to address a predetermined condition detected or otherwise existing at a particular location. For example, in some implementations, if a lane of a roadway has been temporarily blocked off due to construction work (e.g., based on the presence of one or more of traffic cones, traffic barrels, construction signs, merge signs, construction vehicles, etc.), it may be desirable to permit a teleoperations system operator to mark that lane as closed in the mapping data used by an autonomous vehicle. By doing so, the autonomous vehicle will avoid that lane when determining a path or trajectory for the vehicle along the roadway.

As another example, if due to construction traffic is being diverted onto the shoulder or onto another area along a roadway that is normally not used by vehicles, it may be desirable to permit a teleoperations system operator to mark as open the shoulder or another pathway or lane. By doing so, an autonomous vehicle that would otherwise avoid the previously-closed lane would then have the option to use that lane when determining a path or trajectory for the vehicle along the roadway. Further, it should be noted that in some instances, construction work may result in blockages of all of the possible lanes that permit travel in mapping data, so opening a lane in this manner may, in some instances, permit an autonomous vehicle to proceed when otherwise the vehicle would have no valid options to choose based upon the original mapping data.

As another example, in addition to or in lieu of opening or closing a lane, it may be desirable to reduce a speed limit associated with a portion of a roadway. If, for example, a lane is narrowed due to construction or some other condition at a particular location, it may be desirable to mark a lane with a speed limit that is below that maintained in mapping data to ensure that the autonomous vehicle traverses that location at a speed that is appropriate for the current condition.

In the illustrated implementation, modifications to mapping data may modify one or more elements represented in that mapping data. As noted above, in some implementations, mapping data may include elements that represent real world objects such as roadways, boundaries, buildings, traffic devices, as well as elements that are more logical or virtual in nature such as elements that represent valid pathways a vehicle may take within an environment, virtual boundaries such as lane markings, or elements that represent logical collections or sets of other elements. Mapping data may also include in some implementations data that characterizes or otherwise describes elements in an environment, or data that describes the type, function, operation, purpose, etc., of elements in an environment. As such, the modification of an element represented in mapping data may include modifying a location of an element and/or modifying data describing that element. In the context of the examples presented above for example, mapping data modifications may modify elements representing lanes or pathways to effectively change a status of at least a portion of a roadway to mark those lanes or pathways as open or closed and/or modify a speed limit associated with those lanes or pathways, such that when an autonomy component of an autonomous vehicle determines a path or trajectory for the vehicle, the modified elements will be used in that determination.

In addition, in some implementations, mapping data alterations may have spatial and/or temporal extents, which in some instances may be known but in other instances may not be known. Spatial extents, for example, may define a length of roadway subject to a map alteration, e.g., the length of a lane closure or reduced speed limit, such that once an autonomous vehicle traverses that length, the original mapping data representing a lane open status (e.g., whether a lane is marked open or closed) and/or a speed limit status (e.g., a speed limit to use for the lane, an amount or percentage to reduce the speed limit, etc.) may be used when determining the path of the vehicle (e.g., to resume using a lane that was marked closed). While in some instances the spatial extent may be known, and may be provided by a teleoperations system operator, in other instances the spatial extent may not be known, and further monitoring, e.g., by the teleoperations system operator, the autonomous vehicle, or even another autonomous vehicle, may be used to determine the spatial extent. Thus, for example, if it is not possible to determine from viewing the surrounding environment at the beginning of a construction lane closure, the end of the lane closure may be determined later as a result of an autonomous vehicle traveling along the roadway to a location where the end of the lane closure can be confirmed.

Likewise, temporal extents, which also may be known or unknown, may define a length of time that the mapping data alterations are valid and in effect. As with spatial extents, temporal extents may be known, and may be provided by a teleoperations system operator, while in other instances the temporal extent may not be known, and further monitoring, e.g., by the teleoperations system operator, the autonomous vehicle, or even another autonomous vehicle, may be used to determine the temporal extent. Thus, for example, autonomous vehicles and/or teleoperations system operators may, at a later point in time, sense or otherwise determine that construction equipment has been removed and that traffic is flowing in a previously-closed lane, and mapping data may be restored to its original state (e.g., by undoing prior mapping data alterations).

Furthermore, it will be appreciated that in some implementations, it may be desirable to propagate mapping data modifications to autonomous vehicles other than the autonomous vehicle with which a teleoperations session is being conducted. Thus, as an example, if a lane closure is made for one autonomous vehicle, other autonomous vehicles may be provided with the same mapping data alterations such that when those autonomous vehicles reach the same location where the lane closure exists, those autonomous vehicles may react appropriately, and without need for a teleoperations session.

Figure 6:
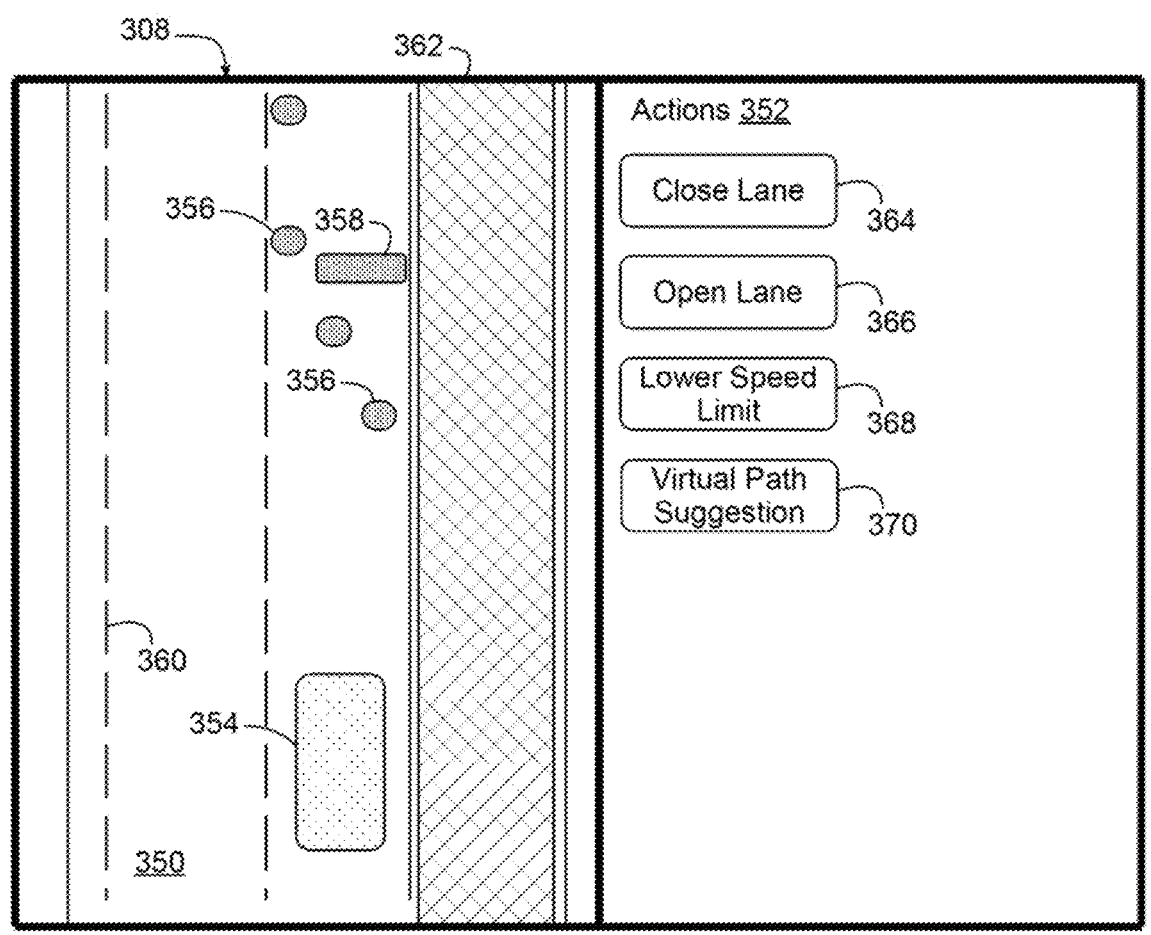
FIG. 6 illustrates an example implementation of the features panel of the teleoperations user interface of FIG. 5.

It may also be desirable in some implementations to provide a user interface to a teleoperations system operator to facilitate rapid comprehension and selection of an appropriate mapping data alteration by the operator. FIG. 6, for example, illustrates an example implementation of feature panel 308 of FIG. 5. In this implementation of feature panel 308, a map sub-panel 350 is displayed alongside an actions sub-panel 352.

Map sub-panel 350 illustrates an overhead view of the vehicle and its environment, and may include, for example, a graphical representation of the autonomous vehicle 354, graphical representations of various other dynamic objects or actors (e.g., construction barrels 356 and construction sign 358), and graphical representations of various boundaries (e.g., lane boundary 360). Other sensor or perception data may also be displayed in the sub-panel in some implementations. Also, it may be desirable to represent a lane closure status for one or more lanes, e.g., as represented by shading 362 for a shoulder of the roadway. It will be appreciated that in many instances a shoulder is normally considered to be a non-drivable portion of a roadway, and as such, it may be desirable in some implementations to indicate that the shoulder is effectively closed, e.g., using a predetermined color or pattern that visually indicates the status of the shoulder. In this current context, the autonomous vehicle is depicted as being on a two lane interstate with both lanes in the same direction (the two lanes for the other direction of traffic are not illustrated in FIG. 6), with the shoulder marked as closed such that the autonomous vehicle will not attempt to travel in the shoulder, and with various construction-related entities, e.g., barrels and signs, being sensed in the lane within which the autonomous vehicle is currently traveling.

Assuming that the autonomous vehicle determines that, based upon the sensed obstructions in the roadway, a teleoperations session is desirable, or that a teleoperations session is otherwise active, the autonomous vehicle may communicate this context data to the teleoperations system, which may then present this context data to a teleoperations system operator along with several actions that may be undertaken, e.g., as represented by controls 364-370 displayed in action sub-panel 352. In some implementations, controls 364-370 may be implemented as soft buttons, with control 364 generating a close lane command, control 366 generating an open lane command, control 368 generating a lower speed limit command, and control 370 generating a virtual path suggestion command (discussed in greater detail below). A wide variety of alternate controls may be used to modify mapping data in the manner described herein, e.g., other graphical controls, voice or gesture inputs, etc. In addition, as will become more apparent below, rather than selecting a command with one user input, in some implementations multiple inputs may be used, e.g., to open a window to view additional information about a mapping data modification and/or to provide additional input for the command.

Figure 7:
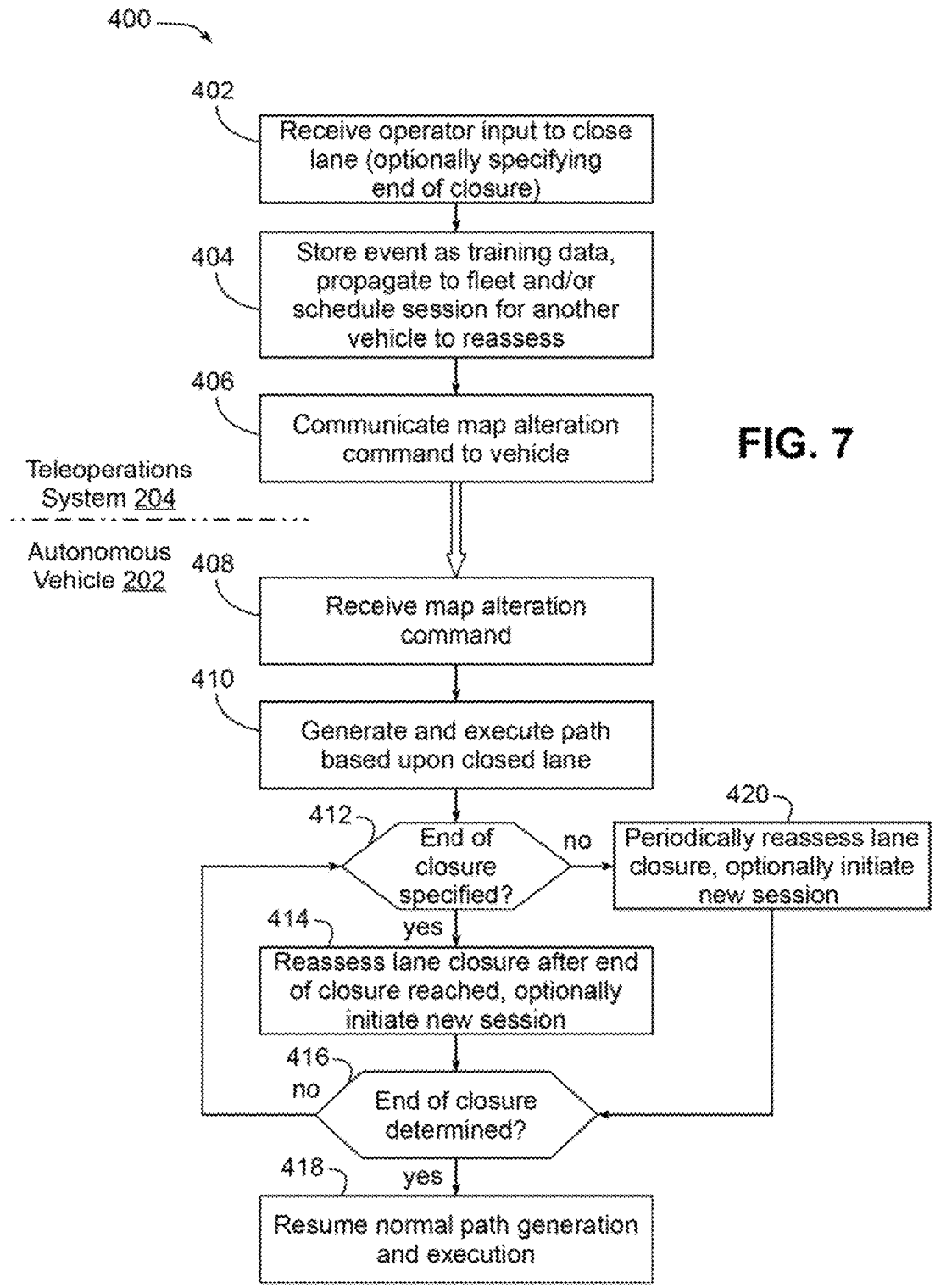
FIG. 7 is a flowchart illustrating an example sequence of operations for closing a lane in the system of FIGS. 2-3.

Now turning to FIG. 7, an example sequence of operations 400 for closing a lane with a teleoperations system or service is illustrated in greater detail. In this sequence of operations, it is assumed that a teleoperations session has already been established between the autonomous vehicle and the teleoperations system, e.g., based upon a condition sensed by the autonomous vehicle, based upon monitoring by a teleoperations system operator, based upon a scheduled teleoperations session, etc. It may also be assumed that at this time context data, e.g., autonomy, sensor, telemetry and/or video data, is being streamed from the autonomous vehicle to the teleoperations system, and is being presented by the teleoperations system to the teleoperations system operator, e.g., via a graphical user interface, as described above in connection with FIG. 4.

Figure 8:
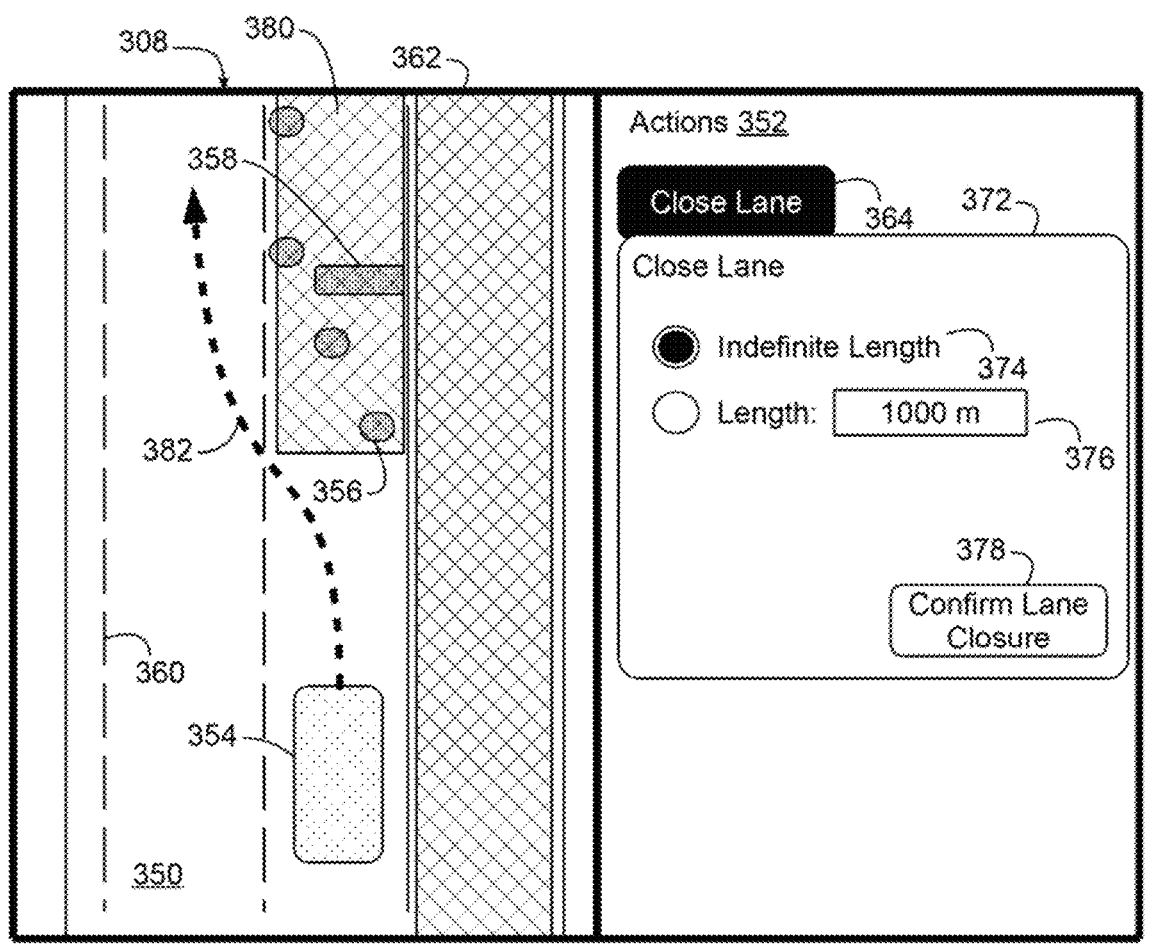
FIG. 8 illustrates an example implementation of the features panel of FIG. 6 when generating operator input to close a lane.

Assume in block 402, operator input is received from a teleoperations system operator to close a lane (e.g., by touching or clicking control 364 of FIG. 6). As illustrated in FIG. 8, for example, operator input to close a lane may cause a dialog 372 to be displayed on actions sub-panel 352, providing the operator with an ability to either select an indefinite length for the lane closure (e.g., via radio button control 374), or to input a predetermined length using textbox control 376. A confirm control 378 may be used to confirm the selection of the lane closure and an optional length, and causing the lane to be marked as closed, e.g., as represented by shading 380 graphically depicted in map sub-panel 350. It will be appreciated that an innumerable number of types of interactions may be used to receive operator input and display a lane closure, so the invention is not limited to this particular interaction. It will be appreciated, for example, that an operator may be permitted to select which lane should be closed via a click or touch in some implementations, and in some implementations, a lane closure may be indicated by dragging over a length of lane to represent both a lane closure and its length. Context menus may be used in some implementations to direct input to a particular lane, and other forms of input, e.g., gestures or voice inputs, may be used to initiate a lane closure in other implementations.

Returning to FIG. 7, upon receipt of the operator input, the teleoperations system in block 404 may optionally perform one or more operations to utilize this operator input more broadly by the overall system. For example, in some implementations, the event data associated with the lane closure may be stored as training data, e.g., to assist in training and improving the performance of a machine learning model used by an autonomous vehicle. As one example, the context data associated with the lane closure, as well as the fact that the lane closure input was chosen by an operator, may be used to reinforce a perception component's assessment that what was perceived in front of the vehicle was related to construction, thereby improving the detection of construction by the perception component.

In addition, in some implementations, block 404 may propagate the lane closure to other vehicles in a fleet of vehicles. By doing so, the mapping data of other vehicles may be modified in a similar manner to the autonomous vehicle currently interacting with the teleoperations system such that when such other autonomous vehicles approach the same geographic location, they will determine appropriate paths or trajectories based on this modified data and be able to navigate through the area without teleoperations assistance.

Further, in some implementations, block 404 may schedule a teleoperations session for another vehicle to reassess the event at a later point in time. For example, block 404 may schedule a location-based reminder for another vehicle such that when the vehicle approaches the same geographical location, teleoperations monitoring may be initiated so that a teleoperations system operator can reassess whether the lane closure is still active, and if not, reopen the lane.

Next, block 406 generates a map alteration command and communicates the command to the vehicle, which is received in block 408. In some implementations, the map alteration command may include modified mapping data or instructions for modifying the mapping data stored in the autonomous vehicle, while in other implementations the modification of the mapping data stored by the autonomous vehicle may be performed by the autonomous vehicle itself based upon receipt of the command.

Next, in block 410 the autonomous vehicle generates and executes a path based upon the closed lane represented in the modified mapping data. For example, as illustrated in FIG. 8, the autonomous vehicle may determine a path 382 that changes lanes based on the lane closure. Thus, rather than having a teleoperations system operator specify an actual path for the autonomous vehicle to follow, the fact that the lane is marked as closed in the modified mapping data enables the autonomous vehicle to choose an appropriate path that still complies with all of the mapping and perception constraints under which the vehicle operates.

Returning to FIG. 7, block 412 next determines whether an end of closure (e.g., based upon a specified length) was specified in the map alteration command. If so, control may pass to block 414, where after the autonomous vehicle has reached the specified end of the closure, either the perception component of the vehicle or a teleoperations system operator (whether in the same or a different session) may reassess the lane closure to determine whether the specified end is accurate, or even if the lane closure still exists. In such instances, mapping data may be further modified to reflect the actual conditions present at the end of the lane closure.

Block 416, for example, may determine whether the specified end of closure was accurate, and if so, pass control to block 418 to enable the autonomous vehicle to return to normal path generation, based upon the fact that the lane closure has been traversed. If the end of closure was not reached, e.g., due to the actual closure being longer than that specified by the map alteration command, block 416 returns control to block 412 to continue assessing the end of the closure.

If block 412 determines that no end of closure is specified in the map alteration command, control instead passes to block 420, where either the vehicle or the teleoperations system operator periodically reassesses the lane closure, with a new session optionally initiated if needed. Control then returns to block 416 to determine whether the end of the closure has been determined to be reached. As such, during travel of the autonomous vehicle proximate a lane closure, either the vehicle or a teleoperations system operator may be able to determine when the lane closure has ended.

Figure 9:
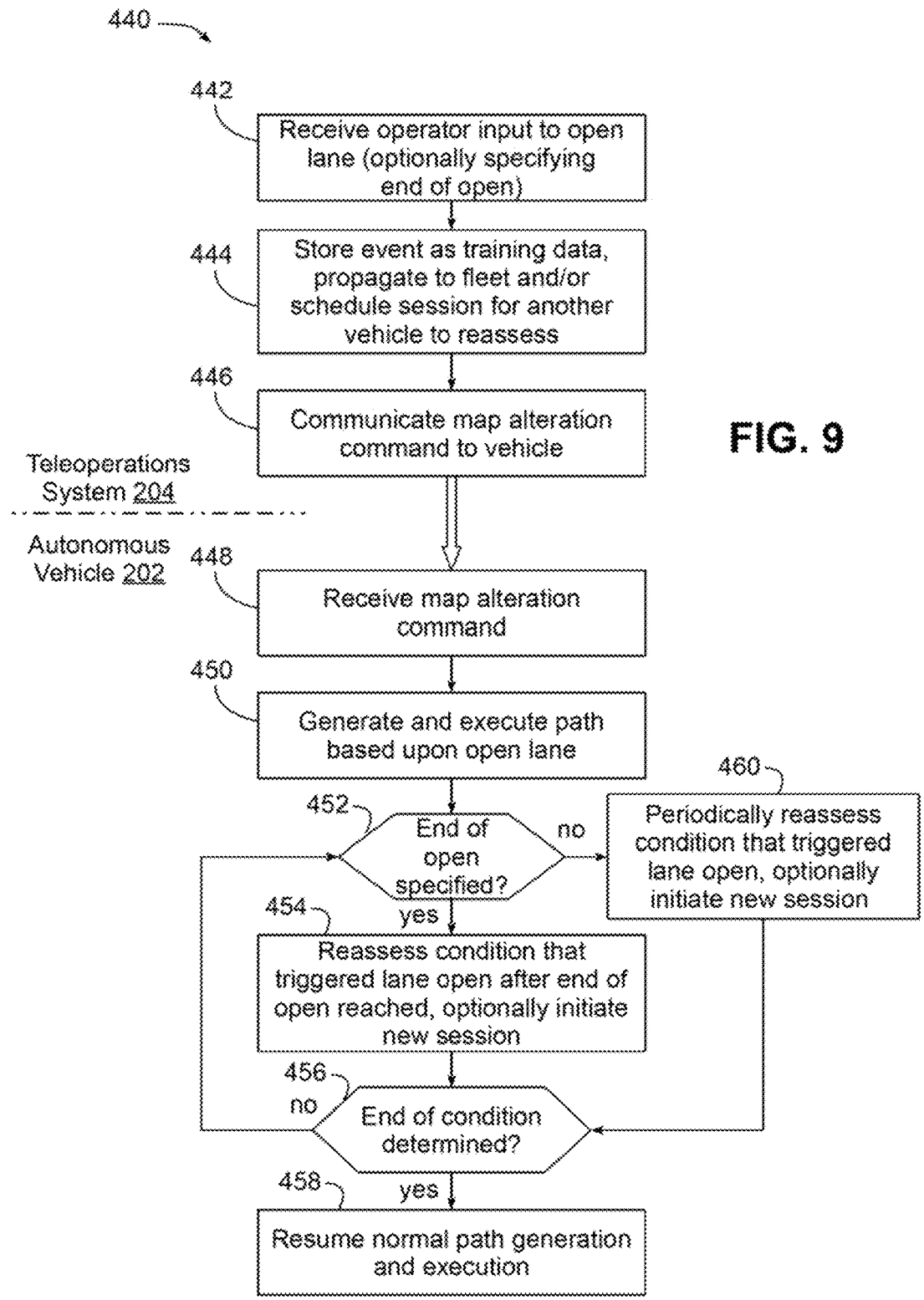
FIG. 9 is a flowchart illustrating an example sequence of operations for opening a lane in the system of FIGS. 2-3.

Now turning to FIG. 9, an example sequence of operations 440 for opening a lane with a teleoperations system or service is illustrated in greater detail. In this sequence of operations, it is assumed that a teleoperations session has already been established between the autonomous vehicle and the teleoperations system, e.g., based upon a condition sensed by the autonomous vehicle, based upon monitoring by a teleoperations system operator, based upon a scheduled teleoperations session, etc. It may also be assumed that at this time context data, e.g., autonomy, sensor, telemetry and/or video data, is being streamed from the autonomous vehicle to the teleoperations system, and is being presented by the teleoperations system to the teleoperations system operator, e.g., via a graphical user interface, as described above in connection with FIG. 4.

Figure 10:
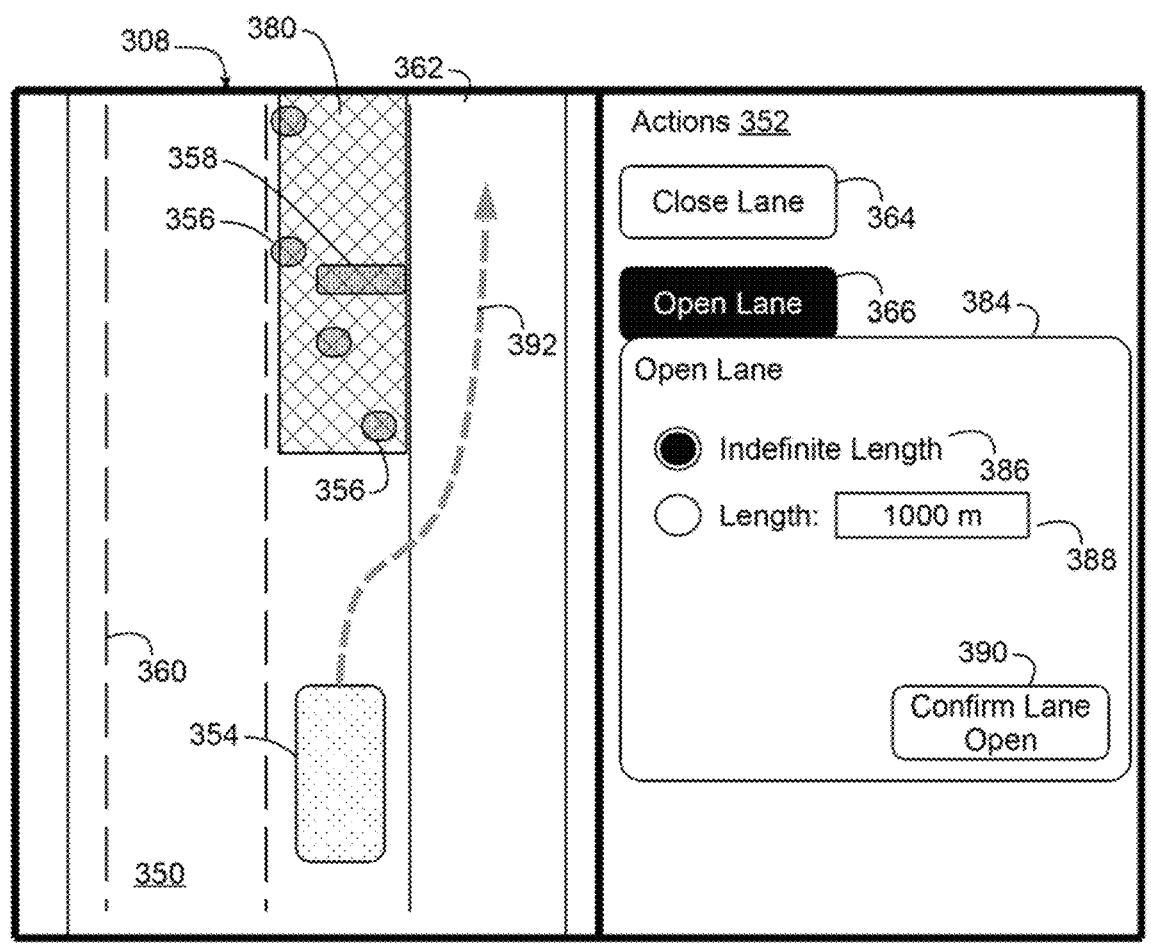
FIG. 10 illustrates an example implementation of the features panel of FIG. 6 when generating operator input to open a lane.

Assume in block 442, operator input is received from a teleoperations system operator to open a lane (e.g., by touching or clicking control 366 of FIG. 6). As illustrated in FIG. 10, for example, operator input to open a lane may cause a dialog 384 to be displayed on actions sub-panel 352, providing the operator with an ability to either select an indefinite length for the lane opening (e.g., via radio button control 386), or to input a predetermined length using textbox control 388. A confirm control 390 may be used to confirm the selection of the lane opening and an optional length, and causing the lane to be marked as opened, e.g., as represented by the removal of shading 380 (FIG. 6) graphically depicted in map sub-panel 350. It will be appreciated that an innumerable number of types of interactions may be used to receive operator input and display a lane opening, so the invention is not limited to this particular interaction. It will be appreciated, for example, that an operator may be permitted to select which lane should be opened via a click or touch in some implementations, and in some implementations, a lane opening may be indicated by dragging over a length of lane to represent both a lane opening and its length. Context menus may be used in some implementations to direct input to a particular lane, and other forms of input, e.g., gestures or voice inputs, may be used to initiate a lane opening in other implementations. Further, lane openings may be graphically represented in other manners in other implementations, e.g., to use a unique color or pattern to represent lanes that are ordinarily closed or otherwise non-drivable but that have been at least temporarily opened.

Returning to FIG. 9, upon receipt of the operator input, the teleoperations system in block 444 may optionally perform one or more operations to utilize this operator input more broadly by the overall system. For example, in some implementations, the event data associated with the lane opening may be stored as training data, e.g., to assist in training and improving the performance of a machine learning model used by an autonomous vehicle. In addition, in some implementations, block 444 may propagate the lane closure to other vehicles in a fleet of vehicles. By doing so, the mapping data of other vehicles may be modified in a similar manner to the autonomous vehicle currently interacting with the teleoperations system such that when such vehicles approach the same geographic location, they will determine appropriate paths or trajectories based on this modified data and be able to navigate through the area without teleoperations assistance. Further, in some implementations, block 444 may schedule a teleoperations session for another vehicle to reassess the event at a later point in time.

Next, block 446 generates a map alteration command and communicates the command to the vehicle, which is received in block 448. In some implementations, the map alteration command may include modified mapping data or instructions for modifying the mapping data stored in the autonomous vehicle, while in other implementations the modification of the mapping data stored by the autonomous vehicle may be performed by the autonomous vehicle itself based upon receipt of the command.

Next, in block 450 the autonomous vehicle generates and executes a path based upon the closed lane represented in the modified mapping data. For example, as illustrated in FIG. 10, the autonomous vehicle may determine a path 392 that directs the vehicle into the shoulder. Thus, rather than having a teleoperations system operator specify an actual path for the autonomous vehicle to follow, the fact that the lane is marked as open in the modified mapping data enables the autonomous vehicle to choose an appropriate path that still complies with all of the mapping and perception constraints under which the vehicle operates. As is also illustrated in FIG. 10, opening a lane in some instances may be preceded by a lane closure (e.g., as represented at 380), where after a lane is closed by the teleoperations system operator, the operator subsequently opens another lane. As but one example, a teleoperations system operator may ascertain from the streamed context data that a construction worker or police officer is directing vehicles onto the shoulder of the roadway, such that opening the shoulder for travel is an appropriate response for the autonomous vehicle.

Returning to FIG. 9, blocks 452-460 attempt to determine and verify an endpoint for the open lane in a similar manner to blocks 412-420 for the lane closure operation of FIG. 7. Thus, either the autonomous vehicle or a teleoperations system operator may determine when or where the lane opening should terminate, e.g., to minimize the distance that a normally non-drivable shoulder or other area is marked for use in the modified mapping data. As such, once the autonomous vehicle has passed the obstruction, construction or other condition that triggered the lane open, the vehicle can return to normal operation, and determine and execute a path that avoids the normally non-drivable lane or area.

Figure 11:
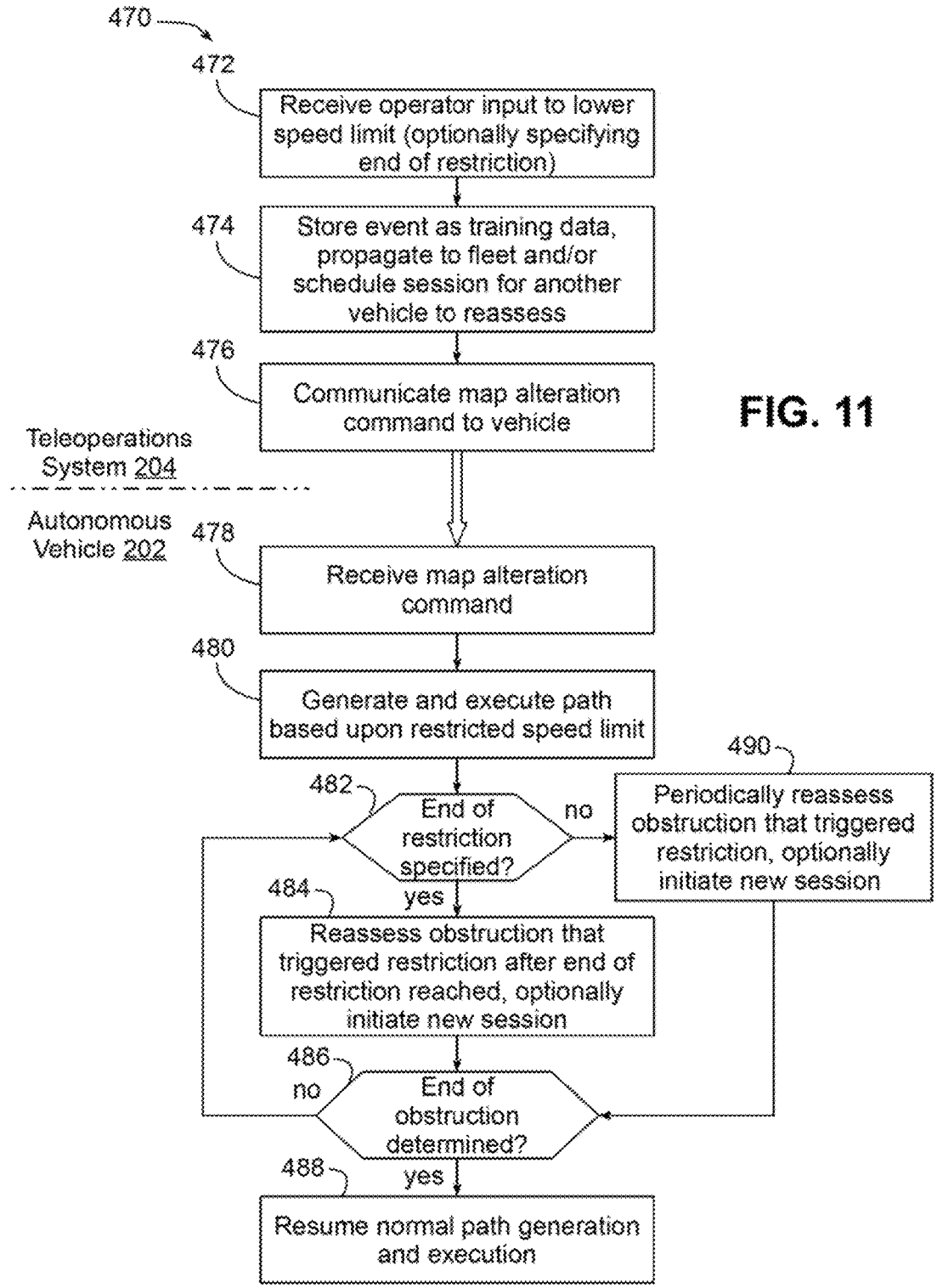
FIG. 11 is a flowchart illustrating an example sequence of operations for lowering a speed limit in the system of FIGS. 2-3.

Now turning to FIG. 11, an example sequence of operations 470 for lowering or reducing a speed limit with a teleoperations system or service is illustrated in greater detail. In this sequence of operations, it is assumed that a teleoperations session has already been established between the autonomous vehicle and the teleoperations system, e.g., based upon a condition sensed by the autonomous vehicle, based upon monitoring by a teleoperations system operator, based upon a scheduled teleoperations session, etc. It may also be assumed that at this time context data, e.g., autonomy, sensor, telemetry and/or video data, is being streamed from the autonomous vehicle to the teleoperations system, and is being presented by the teleoperations system to the teleoperations system operator, e.g., via a graphical user interface, as described above in connection with FIG. 4.

Assume in block 472, operator input is received from a teleoperations system operator to lower a speed limit (e.g., by touching or clicking control 368 of FIG. 6). Similar to a lane closure or lane open, an appropriate user interaction may occur to receive the operator input, and if desired, to specify a length or duration of the reduced speed limit. In addition, a predetermined speed limit or an amount to reduce the speed limit by, may also be included in the operator input.

Next, the teleoperations system in block 474 may optionally perform one or more operations to utilize this operator input more broadly by the overall system. For example, in some implementations, the event data associated with the speed limit reduction may be stored as training data, e.g., to assist in training and improving the performance of a machine learning model used by an autonomous vehicle. In addition, in some implementations, block 474 may propagate the reduced speed limit to other vehicles in a fleet of vehicles. By doing so, the mapping data of other vehicles may be modified in a similar manner to the autonomous vehicle currently interacting with the teleoperations system such that when such other autonomous vehicles approach the same geographic location, they will determine appropriate paths or trajectories based on this modified data and be able to navigate through the area without teleoperations assistance. Further, in some implementations, block 474 may schedule a teleoperations session for another vehicle to reassess the event at a later point in time.

Next, block 476 generates a map alteration command and communicates the command to the vehicle, which is received in block 478. In some implementations, the map alteration command may include modified mapping data or instructions for modifying the mapping data stored in the autonomous vehicle, while in other implementations the modification of the mapping data stored by the autonomous vehicle may be performed by the autonomous vehicle itself based upon receipt of the command.

Next, in block 480 the autonomous vehicle generates and executes a path based upon the reduced speed limit represented in the modified mapping data. Blocks 482-490 then attempt to determine and verify an endpoint for the reduced speed limit in a similar manner to blocks 412-420 for the lane closure operation of FIG. 7. Thus, either the autonomous vehicle or a teleoperations system operator may determine when or where the reduced speed limit should terminate, e.g., based upon having already passed an obstruction such as a disabled vehicle, traffic cones or barrels, etc. As such, once the autonomous vehicle has passed the obstruction, construction or other condition that triggered the lane open, the vehicle can return to normal operation, and determine and execute a path that follows the official speed limit posted for the roadway.

Figure 12:
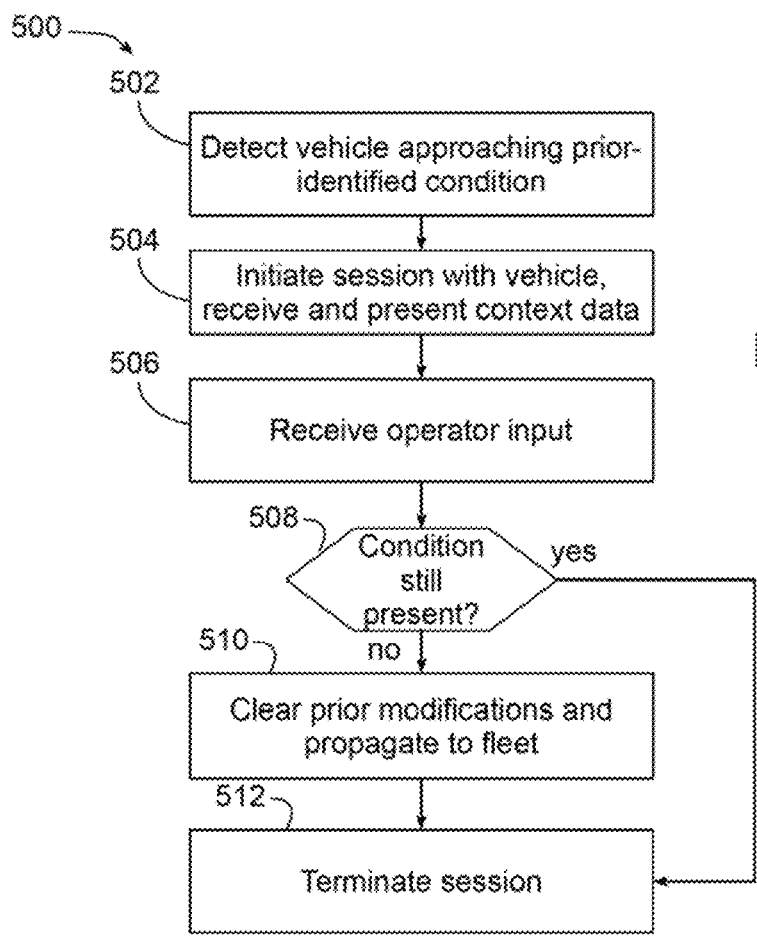
FIG. 12 is a flowchart illustrating an example sequence of operations for automatically initiating a teleoperations session to reassess a prior condition in the system of FIGS. 2-3.

Now turning to FIG. 12, as mentioned above, in some implementations it may be desirable to schedule the same or other autonomous vehicles to reassess mapping data modifications made during teleoperations sessions with particular autonomous vehicles. In some implementations, for example, the scheduling may be based similar to location-based reminders, whereby geofencing is effectively used to automatically initiate a teleoperations session whenever a vehicle enters a particular geographical location, or alternatively, whenever a vehicle is being navigated along the same roadway and is approaching a particular condition that was used to trigger a mapping data modification. Thus, as illustrated by sequence of operations 500 in FIG. 12, when a vehicle is detected (either by the vehicle itself or by the teleoperations system) as approaching a prior-identified condition (block 502), a teleoperations session may be initiated with the vehicle (block 504), resulting in a teleoperations system operator being presented with context data suitable for attaining situational awareness suitable for reassessing whether the original condition (e.g., a construction lane closure) is still present.

Block 506 then receives operator input from a teleoperations system operator, and block 508 determines if the condition is still present based upon that input. For example, an operator may be presented with controls for indicating when a condition still exists or when a condition has been cleared. If the condition no longer exists, block 508 passes control to block 510 to clear the prior mapping data modifications in the autonomous vehicle, and in some instances, propagate to the rest of the fleet such that all autonomous vehicles in the fleet with the modified mapping data can reverse the modifications. Block 512 then terminates the session. In addition, returning to block 508, if the condition is determined to still be present, block 508 bypasses block 510 and passes control to block 512 to terminate the session.

Thus, in some implementations, a teleoperations system operator may be permitted to alter mapping data used by an autonomous vehicle to make certain lanes, roadways, or other areas either available or unavailable for autonomous operation. Further, in some implementations, operators may be permitted to select specific points along a roadway at which to start a mapping data modification, and in some implementations, a default behavior may automatically apply the modification to the end of a particular segment (e.g., a tile or region) of mapping data. Options may be provided to mark continuations of a modification through other segments in their entirety, although more granular control may also be supported in other implementations. In addition, entire roadways may be modified in some implementations, e.g., by closing all drivable lanes along a roadway. In addition, mapping data modifications in some implementations may automatically trigger reroutes of autonomous vehicles.

In addition, in some implementations, an autonomous vehicle may validate any mapping data modifications, e.g., to reject any lane closures that would cover the current location of the vehicle (or otherwise create an inevitable passage beyond the end of an available lane if the vehicle is in motion). Other variations will be appreciated by those of ordinary skill having the benefit of the instant disclosure.

Virtual Path Suggestions

It may also be desirable in some implementations to support an ability for a teleoperations system to suggest a particular virtual path to address a particular condition existing the environment surrounding an autonomous vehicle. In some implementations, for example, virtual path suggestions may be used to handle more complex situations that cannot be adequately handled via mapping data modifications, e.g., where a relatively complex path is needed to traverse through a drivable space that is not mapped with autonomous lanes, and where lane closures or openings are insufficient to enable an autonomous vehicle to determine a suitable path for addressing a particular condition. Thus, a virtual path suggestion may be considered in some implementations to represent a suggestion by a teleoperations system to an autonomous vehicle of a specific path or trajectory to follow from the autonomous vehicle's current position. Notably, and as will become more apparent below, a virtual path suggestion may be considered a suggestion because in such implementations the autonomous vehicle will still attempt to validate the suggested virtual path and may reject the suggestion in response to some determined violation of a vehicle constraint or boundary that could occur were the suggestion accepted by the autonomous vehicle.

In some implementations, for example, a teleoperations system operator may provide a virtual path suggestion input to a teleoperations system that enables the teleoperations system or the autonomous vehicle to define a virtual path of travel for the autonomous vehicle. Path data associated with this virtual path of travel may be communicated in some implementations from the teleoperations system to the autonomous vehicle, from which the autonomous vehicle may then generate a path for the autonomous vehicle that follows the virtual path of travel defined by the path data.

The virtual path suggestion input may be generated in a number of manners in different implementations, e.g., by specifying one or more points on a map, by tracing a path on a map, or in other suitable manners for defining a path of travel. Path data in some implementations may therefore include one or more points, one or more line segments, one or more curved segments, or other data suitable for defining a path of travel.

In some implementations, virtual path suggestions may only be supported when the autonomous vehicle is stopped. Furthermore, in some implementations, virtual path suggestions may respect virtual pathways and boundaries that may exist around the path defined by the virtual path suggestion input, perception constraints, and any hard road boundaries, but may otherwise ignore any traffic controls that are present as well as any existing lane boundaries and directions of travel. Thus, in some implementations, when virtual path suggestions are active and data for a virtual path has been received from a teleoperations system, the virtual path may not pass validation and may not be executed if it is determined to violate a hard road boundary, but may pass validation if no hard road boundaries are violated, even if the virtual path would ordinarily be otherwise prohibited due to a traffic control, lane boundary and/or direction of travel established in the mapping data.

Also, in some implementations, virtual path suggestions may be restricted to certain geographical locations and/or situations. For example, virtual path suggestions may not be supported in some implementations for virtual paths that overlap with intersections or other areas governed by traffic control, or that enter opposite-traffic lanes that are not currently marked as restricted or closed for opposing traffic. Suitable situations may include, for example, delimited cone lanes in the same direction of traffic, alternating traffic controlled by a flagger, or where oncoming traffic is blocked completely due to a road closure.

Figure 13:
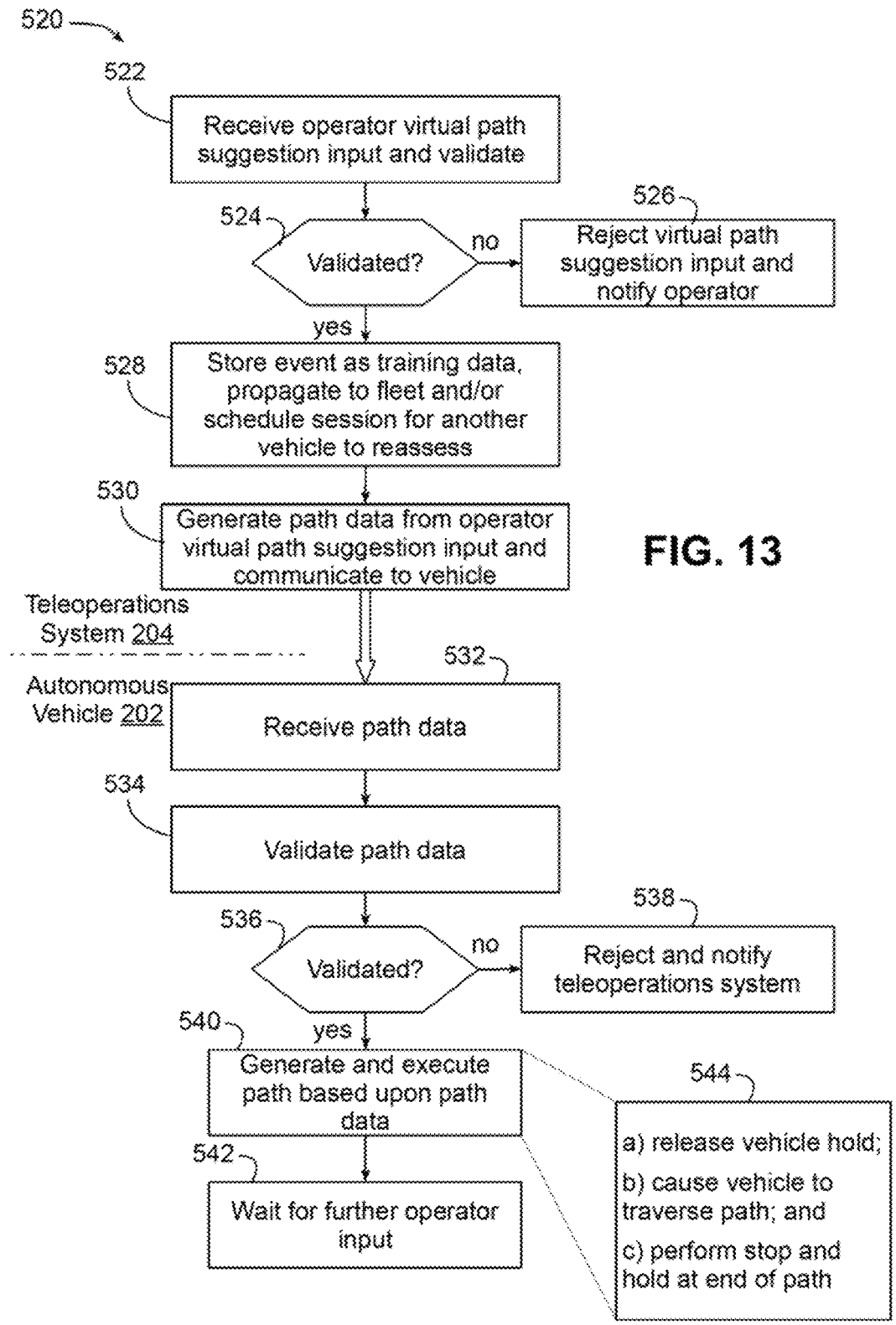
FIG. 13 is a flowchart illustrating an example sequence of operations for virtual path suggestions in the system of FIGS. 2-3.

Now turning to FIG. 13, an example sequence of operations 400 for performing virtual path suggestion with a teleoperations system or service is illustrated in greater detail. In this sequence of operations, it is assumed that a teleoperations session has already been established between the autonomous vehicle and the teleoperations system, e.g., based upon a condition sensed by the autonomous vehicle, based upon monitoring by a teleoperations system operator, based upon a scheduled teleoperations session, etc. It may also be assumed that at this time context data, e.g., autonomy, sensor, telemetry and/or video data, is being streamed from the autonomous vehicle to the teleoperations system, and is being presented by the teleoperations system to the teleoperations system operator, e.g., via a graphical user interface, as described above in connection with FIG. 4.

Figure 14:
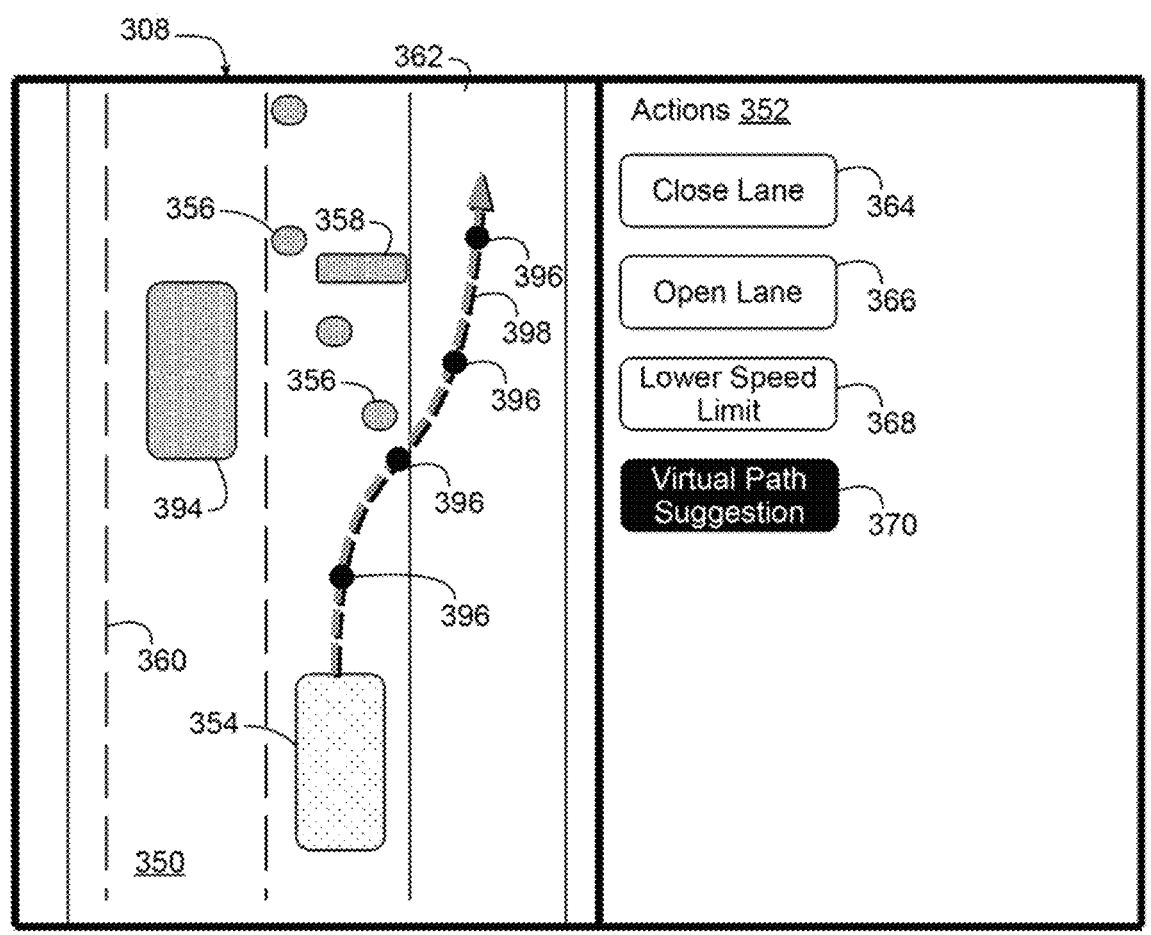
FIG. 14 illustrates an example implementation of the features panel of FIG. 6 when generating virtual path suggestions.

Assume in block 522, operator virtual path suggestion input is received from a teleoperations system operator to define a virtual path of travel (e.g., by touching or clicking control 370 of FIG. 6). As illustrated in FIG. 14, for example, operator input to define a virtual path of travel may be based upon an operator touching or clicking on a plurality of points 396, to which a curve may be fit to define a virtual path of travel, and which may be displayed to an operator as illustrated at 398. It will be appreciated that an innumerable number of types of interactions may be used to receive operator input and display a virtual path of travel, so the invention is not limited to this particular interaction. It will be appreciated, for example, that an operator may be permitted to trace the path by dragging along a desired course. An operator may also be able to edit the path, e.g., by moving one or more points 396, adding additional points, deleting points, etc. In addition, in some instances points 396 may be created prior to selecting control 370, whereby control 370 effectively generates the path data based upon the currently-displayed points.

Returning to FIG. 13, upon receipt of the operator virtual path suggestion input, the teleoperations system may locally validate the input, and block 524 may determine if the input was validated, and if not, pass control to block 526 to reject the input and notify the operator. For example, if the virtual path is determined to cross a hard road boundary, or any other constraint described above, the virtual path suggestion input may be rejected.

Returning to block 524, if the input passes the initial validation, control passes to block 528 to optionally perform one or more operations to utilize this operator input more broadly by the overall system. For example, in some implementations, the event data associated with the virtual path suggestion may be stored as training data, e.g., to assist in training and improving the performance of a machine learning model used by an autonomous vehicle. As one example, the context data associated with the virtual path suggestion, as well as the fact that the virtual path suggestion input was entered by an operator, may be used to reinforce a perception component's assessment that what was perceived in front of the vehicle was related to construction, thereby improving the detection of construction by the perception component.

In addition, in some implementations, block 524 may propagate path data for the virtual path of travel to other vehicles in a fleet of vehicles. By doing so, other vehicles may potentially implement the same path when such vehicles approach the same geographic location. Further, in some implementations, block 524 may schedule a teleoperations session for another vehicle to reassess the event at a later point in time.

Next, block 530 generates path data corresponding to the virtual path suggestion input and communicates the path data to the vehicle, which is received in block 532. In some implementations, the path data may include multiple points on a map or another definition of a path, e.g., one or more line and/or curved segments.

Block 534 next validates the path data from the perspective of the autonomous vehicle. Validation, for example, may determine whether the virtual path defined by the path data violates any perception or other vehicle constraints, as well as any hard road boundaries. As noted above, however, validation may different from validation performed in other scenarios, e.g., to validate virtual paths that would ordinary not be validated in the absence of performing a virtual path suggestion operation. Thus, for example, validation may occur even in the presence of traffic controls, lane boundaries and/or directions of travel that otherwise would be violated during ordinary operation of the autonomous vehicle.

If the path data fails validation, block 536 passes control to block 538 to reject the path data and notify the teleoperations system. Otherwise, block 536 passes control to block 540 to generate and execute a path based upon the path data, and upon completion of the execution, passes control to block 542 to wait for further operator input. In particular, in the illustrated implementation, virtual path suggestion may be limited to situations where the vehicle is already stopped, and as illustrated in block 544, the generation and execution of the path in block 540 may be performed in three phases. In a first phase, a vehicle hold is released and in a second phase, the vehicle traverses the virtual path, generally at a lower maximum speed (which may be determined, e.g., based upon other lanes in the vicinity or based on hard coding for virtual path suggestion). It will be appreciated that during this traversal, the vehicle will continue to validate the initially validated path to maintain adherence to current vehicle and environmental constraints. Then, in a third phase, a stop and hold may be performed to bring the vehicle to a stop at the end of the virtual path and provide an ability for the teleoperations system operator to assess the current context and either provide another virtual path suggestion input or utilize other teleoperations functionality. Also, in some implementations, at the end of a virtual path, the autonomous vehicle may resume normal operation, and automatically reroute based upon original mapping data. In some instances, however, resumption of normal operation may be deferred until a hold is released.

Other variations will be apparent to those of ordinary skill. Therefore, the invention lies in the claims hereinafter appended.

What is claimed is:

1. A method, comprising:
   in a teleoperations system in communication with an autonomous vehicle operating in an environment and remote from the teleoperations system, receiving context data collected by the autonomous vehicle from the environment in which the autonomous vehicle operates;
   presenting the received context data to a teleoperations system operator to provide situational awareness to the teleoperations system operator; and
   in the teleoperations system and in response to virtual path suggestion input defining a virtual path of travel and received from the teleoperations system operator, communicating path data to the autonomous vehicle to cause the autonomous vehicle to generate a path for the autonomous vehicle and to autonomously operate the autonomous vehicle to follow the virtual path of travel, wherein the virtual path suggestion input received from the teleoperations system operator specifies a plurality of selected points on a map presented to the teleoperations system operator by the teleoperations system, and wherein the path data describes the plurality of selected points.

2. The method of claim 1, further comprising:
   validating the virtual path suggestion input received from the teleoperations system operator in the teleoperations system prior to communicating the path data to the autonomous vehicle; and
   in response to unsuccessful validation of the virtual path suggestion input, rejecting the virtual path suggestion input.

3. The method of claim 2, wherein validating the virtual path suggestion input includes determining whether the virtual path of travel defined by the virtual path suggestion input violates a hard road boundary.

4. The method of claim 1, wherein the virtual path suggestion input is a first virtual path suggestion input, the path is a first path, the virtual path of travel is a first virtual path of travel, and the path data is first path data, wherein the method further comprises, in the teleoperations system and in response to a second virtual path suggestion input defining a second virtual path of travel and received from the teleoperations system operator, communicating second path data to the autonomous vehicle to cause the autonomous vehicle to generate a second path for the autonomous vehicle and to autonomously operate the autonomous vehicle to follow the second virtual path of travel, wherein the second virtual path suggestion input received from the teleoperations system operator specifies a traced path on a map presented to the teleoperations system operator, and wherein the second path data describes the traced path.

5. A method, comprising:
   in an autonomous vehicle operating in an environment, communicating context data collected by the autonomous vehicle from the environment in which the autonomous vehicle operates to a teleoperations system in communication with and remote from the autonomous vehicle to provide situational awareness to a teleoperations system operator of the teleoperations system;
   in the autonomous vehicle, receiving path data from the teleoperations system generated in response to virtual path suggestion input defining a virtual path of travel and received from the teleoperations system operator; and
   in the autonomous vehicle and in response to the path data:
      generating a path for the autonomous vehicle that causes the autonomous vehicle to follow the virtual path of travel defined by the path data;
      releasing a first hold on the autonomous vehicle;
      autonomously operating the autonomous vehicle to traverse the generated path after releasing the first hold; and
      at the end of the generated path, automatically initiating a second hold on the autonomous vehicle such that the autonomous vehicle stops and waits for further data from the teleoperations system.

6. The method of claim 5, further comprising:
   validating the path data; and
   in response to unsuccessful validation of the path data, rejecting the path data.

7. The method of claim 6, wherein validating the path data includes determining in the autonomous vehicle whether the virtual path of travel defined by the path data violates a hard road boundary.

8. The method of claim 6, wherein validating the path data is performed in the autonomous vehicle and validates the path data irrespective of a traffic control, lane boundary or direction of travel that would ordinarily prohibit travel of the autonomous vehicle through the virtual path of travel defined by the path data in the absence of receiving the path data from the teleoperations system.

9. The method of claim 5, further comprising determining whether executing the path violates any perception constraint for the autonomous vehicle.

10. The method of claim 5, wherein the path data describes a plurality of points representing the virtual path of travel.

11. A system, the system comprising one or more processors in a teleoperations system remotely located from an autonomous vehicle and configured to:
receive context data collected by the autonomous vehicle from the environment in which the autonomous vehicle operates;
present the received context data to a teleoperations system operator to provide situational awareness to the teleoperations system operator; and
in response to virtual path suggestion input defining a virtual path of travel and received from the teleoperations system operator, communicate path data to the autonomous vehicle to cause the autonomous vehicle to generate a path for the autonomous vehicle and to autonomously operate the autonomous vehicle to follow the virtual path of travel, wherein the virtual path suggestion input received from the teleoperations system operator specifies a plurality of selected points on a map presented to a teleoperations system operator, and wherein the path data describes the plurality of selected points.

12. The system of claim 11, wherein the one or more processors are further configured to:
validate the virtual path suggestion input received from the teleoperations system operator in the teleoperations system prior to communicating the path data to the autonomous vehicle; and
in response to unsuccessful validation of the virtual path suggestion input, reject the virtual path suggestion input.

13. The system of claim 12, wherein the one or more processors are configured to validate the virtual path suggestion input by determining whether the virtual path of travel defined by the virtual path suggestion input violates a hard road boundary.

14. The system of claim 11, wherein the virtual path suggestion input is a first virtual path suggestion input, the path is a first path, the virtual path of travel is a first virtual path of travel, and the path data is first path data, wherein the one or more processors are further configured to, in response to a second virtual path suggestion input defining a second virtual path of travel and received from the teleoperations system operator, communicate second path data to the autonomous vehicle to cause the autonomous vehicle to generate a second path for the autonomous vehicle and to autonomously operate the autonomous vehicle to follow the second virtual path of travel, wherein the second virtual path suggestion input received from the teleoperations system operator specifies a traced path on a map presented to the teleoperations system operator, and wherein the second path data describes the traced path.

15. The system of claim 11, further comprising one or more additional processors disposed in the autonomous vehicle and configured to:
communicate the context data collected by the autonomous vehicle to the one or more processors in the teleoperations system remotely located from the autonomous vehicle;
receive the path data communicated by the one or more processors in the teleoperations system remotely located from the autonomous vehicle; and
generate the path that causes the autonomous vehicle to follow the virtual path of travel defined by the path data.

16. The system of claim 15, wherein the one or more additional processors disposed in the autonomous vehicle are further configured to validate the path data, and in response to unsuccessful validation of the path data, reject the path data, and wherein the one or more additional processors disposed in the autonomous vehicle are configured to validate the path data by determining whether the virtual path of travel defined by the path data violates a hard road boundary or determining whether executing the path violates any perception constraint for the autonomous vehicle.

17. The system of claim 15, wherein the one or more additional processors disposed in the autonomous vehicle are further configured to, after receiving the path data:
release a first hold on the autonomous vehicle to allow the autonomous vehicle to traverse the generated path; and
at the end of the generated path, automatically initiate a second hold on the autonomous vehicle such that the autonomous vehicle stops and waits for further data from the teleoperations system.

* * * * *